(12) United States Patent
Nemedi

(10) Patent No.: US 7,673,741 B2
(45) Date of Patent: Mar. 9, 2010

(54) APPARATUS AND METHOD FOR CONVEYING MATERIALS

(75) Inventor: William D. Nemedi, Paw Paw, MI (US)

(73) Assignee: Inter-Source Recovery Systems, Kalamazoo, MI (US)

( * ) Notice: Subject to any disclaimer, the term of this patent is extended or adjusted under 35 U.S.C. 154(b) by 0 days.

(21) Appl. No.: 11/461,199

(22) Filed: Jul. 31, 2006

(65) Prior Publication Data

US 2007/0029171 A1 Feb. 8, 2007

Related U.S. Application Data

(60) Provisional application No. 60/706,640, filed on Aug. 8, 2005, provisional application No. 60/804,151, filed on Jun. 7, 2006.

(51) Int. Cl.
*B65G 15/60* (2006.01)
(52) U.S. Cl. ............... 198/841; 198/837; 198/861.1; 198/835; 198/834; 198/844.1; 198/836.1; 198/836.2; 198/840; 198/853; 198/836.3
(58) Field of Classification Search ............. 198/834, 198/835, 844.1, 860.1, 866.1, 862.1, 831, 198/841, 861.1, 962.1, 837, 836.1, 836.2, 198/836.3
See application file for complete search history.

(56) References Cited

U.S. PATENT DOCUMENTS

| 3,429,652 A | * | 2/1969 | Varga ........................ 118/423 |
| 3,650,376 A |  | 3/1972 | Burgis et al. |
| 3,901,379 A |  | 8/1975 | Bruhm |
| 4,038,152 A |  | 7/1977 | Atkins |
| 4,144,965 A | * | 3/1979 | Alldredge et al. ........... 198/838 |
| 4,294,059 A | * | 10/1981 | Stilwell et al. ................ 53/448 |
| 4,820,143 A |  | 4/1989 | Eroskey et al. |
| 5,106,487 A |  | 4/1992 | Nemedi |
| 5,320,214 A | * | 6/1994 | Kordis ........................ 198/837 |
| 5,320,589 A | * | 6/1994 | Singleton et al. ............. 482/54 |
| 5,431,613 A |  | 7/1995 | Singleton et al. |
| 6,053,307 A |  | 4/2000 | Honda |
| 6,564,931 B1 |  | 5/2003 | Edelmann |
| 6,843,444 B2 | * | 1/2005 | Wood ....................... 242/534.1 |
| 6,962,252 B2 | * | 11/2005 | Fujiwara et al. ............. 198/837 |
| 2001/0025769 A1 |  | 10/2001 | Roet et al. |

OTHER PUBLICATIONS

Chantland Company, 2005 Pulleys & Rollers Catalog (3 pages).

* cited by examiner

*Primary Examiner*—Gene Crawford
*Assistant Examiner*—Kavel P Singh
(74) *Attorney, Agent, or Firm*—Marshall, Gerstein & Borun LLP

(57) ABSTRACT

A conveyor apparatus and method for conveying materials in which the conveyor belt has chord members located along each belt side. The chord members are adapted to fit within a slotted track assembly whereby the chord members slide relative to the track assemblies when the conveyor is actuated.

23 Claims, 21 Drawing Sheets

APPARATUS AND METHOD FOR CONVEYING MATERIALS

This application claims the benefit under 35 U.S.C. 119(e) of U.S. Provisional Application No. 60/706,640, filed Aug. 8, 2005, and U.S. Provisional Application No. 60/804,151, filed Jun. 7, 2006, both of which are hereby incorporated by reference in their entirety in the present application.

FIELD

The method for conveying and the conveying apparatus disclosed herein relate generally to conveying materials such as wet chips that are subsequently separated into dry materials and fluids; and more specifically, to a conveyor apparatus that utilizes a conveyor belt as well as a chord member and keyhole slot track assembly to transport material on the conveyor belt from one location to another.

BACKGROUND

It is well known to utilize a conveyor system for transporting materials such as wet chips generated in the course of a machining operation. The wet chips often are placed on a conveyor at a machine tool station where the wet chips are generated. The conveyor then generally conveys the wet chips to a centrifugal separator station such as illustrated in Nemedi, U.S. Pat. No. 5,106,487 where the wet chips are separated into dry chips and fluids.

Different conveyor apparatus are employed to transport the wet chips. One system includes the use of a metal or plastic conveyor belt that has a plurality of roller assemblies attached to the sides of the belt. The roller assemblies serve as carriages adapted to ride in tracks located on the opposite sides of the conveyor apparatus. This type conveyor apparatus has been found to be relatively costly and generally includes a substantial number of components, all of which are subject to maintenance problems. Moreover, when this conveyor apparatus is employed to convey wet chips, it has been found that fluid in the wet chips escapes from the system as it travels to the sides of the conveyor and out of the conveyor apparatus. Further, it has been found that wet chips on the conveyor sometimes come in contact with various conveyor components and cause them to malfunction. The conveyor system then has to be removed from service and the malfunction corrected.

Accordingly, it is desired to have a conveyor system for transporting materials such as wet chips wherein the conveyor apparatus has a reduced number of parts when compared to the roller system conveyor apparatus presently available. It is further desired to have a conveyor apparatus where the undesired escape of wet chip fluid into various conveyor components is obviated. Further, it is desired to reduce or limit contact between conveyed wet chips and the various components of the conveyor apparatus transporting the wet chips.

SUMMARY

Briefly, a conveyor system may have a flexible conveyor belt fashioned into an endless conveyor belt. The belt may have two sides with a flexible chord member located at each side of the conveyor belt. The ends of each chord member may be joined together to form endless chord members.

The conveyor frame assembly includes a pair of spaced frame sidewalls. A track assembly is attached to each sidewall. Each track assembly includes a track formed by a keyhole slot having a slot profile which mates with the profile of a mating conveyor belt chord member. Each chord member is inserted into a corresponding track slot.

Upon actuation of a drive assembly, the conveyor belt moves relative to the conveyor frame assembly and the chord members each slide within their respective track slots. The chord member-slot connections are such that it is believed that a substantial dynamic seal is formed between the track assemblies and the sliding conveyor belt chord members. The seal arrangement is expected to substantially preclude wet chips and wet chip fluid from passing through the conveyor apparatus at the location of the seal arrangement.

Other advantages of such a conveyor system will become apparent from the drawings and the following detailed description of the method of conveying and the conveyor apparatus.

DETAILED DESCRIPTION

An exemplary apparatus 10 comprises a housing assembly 11 that, as illustrated in FIGS. 1-4, includes base 12. Sidewall 13 extends upwardly from one side edge of base 12 and is flanged inwardly at 14. Sidewall 15 extends upwardly from the remaining side edge of base 12 and is flanged inwardly at 16.

Figure 1:
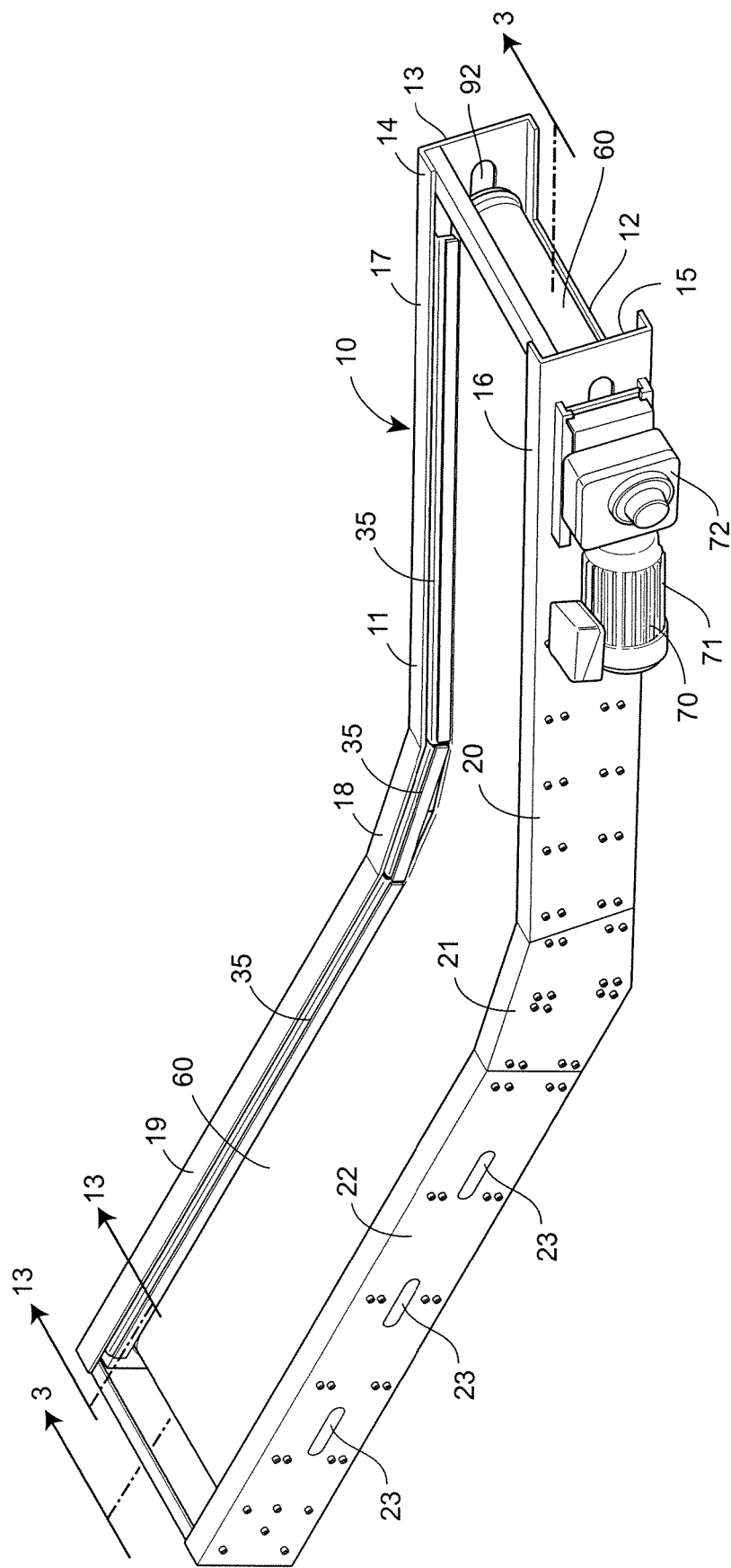
FIG. 1 shows a perspective view of the conveyor apparatus.
Figure 2:
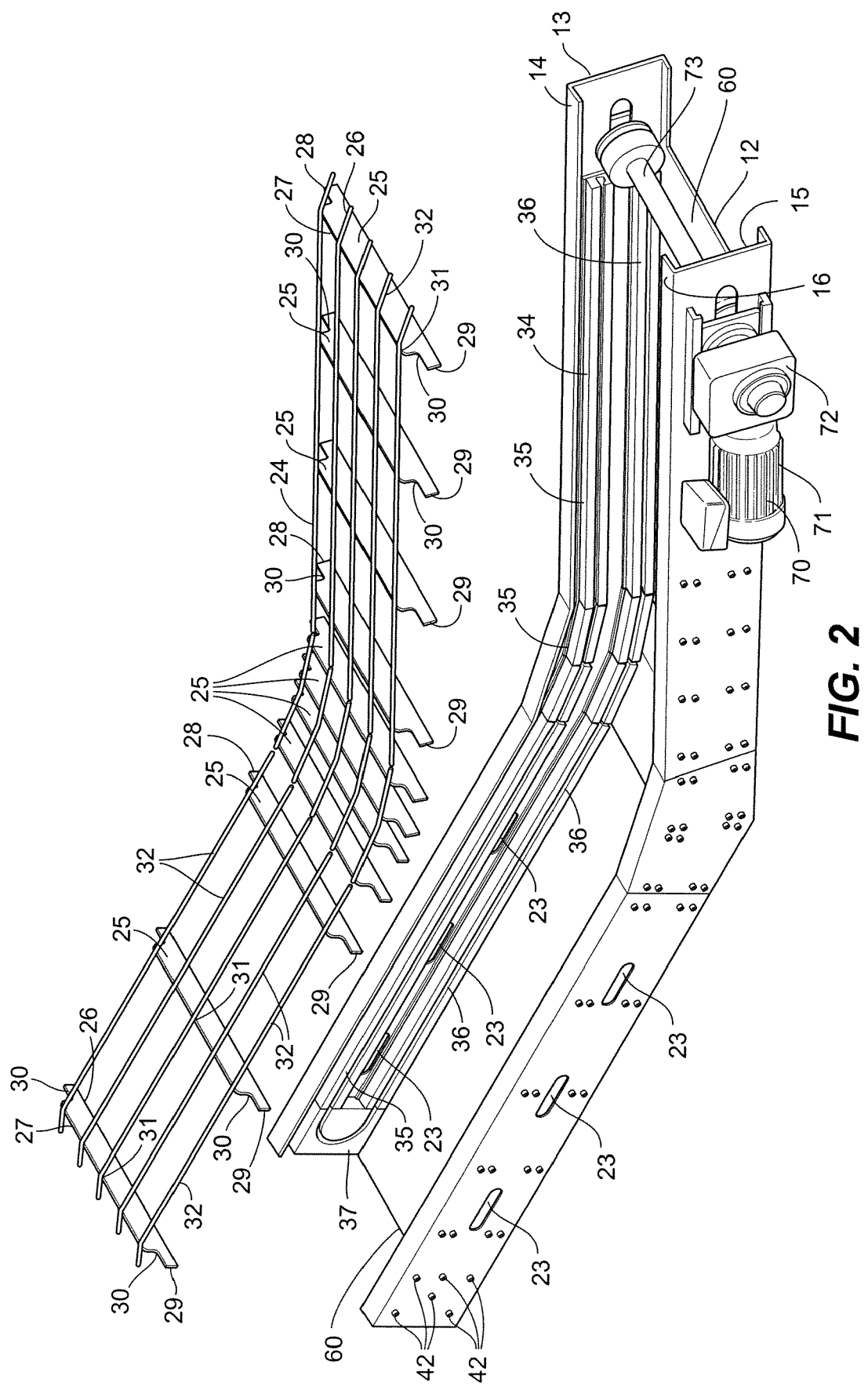
FIG. 2 shows a partial perspective view of the conveyor apparatus of FIG. 1 with the conveyor belt removed and the conveyor belt support track assembly spaced from the conveyor apparatus.
Figure 3:
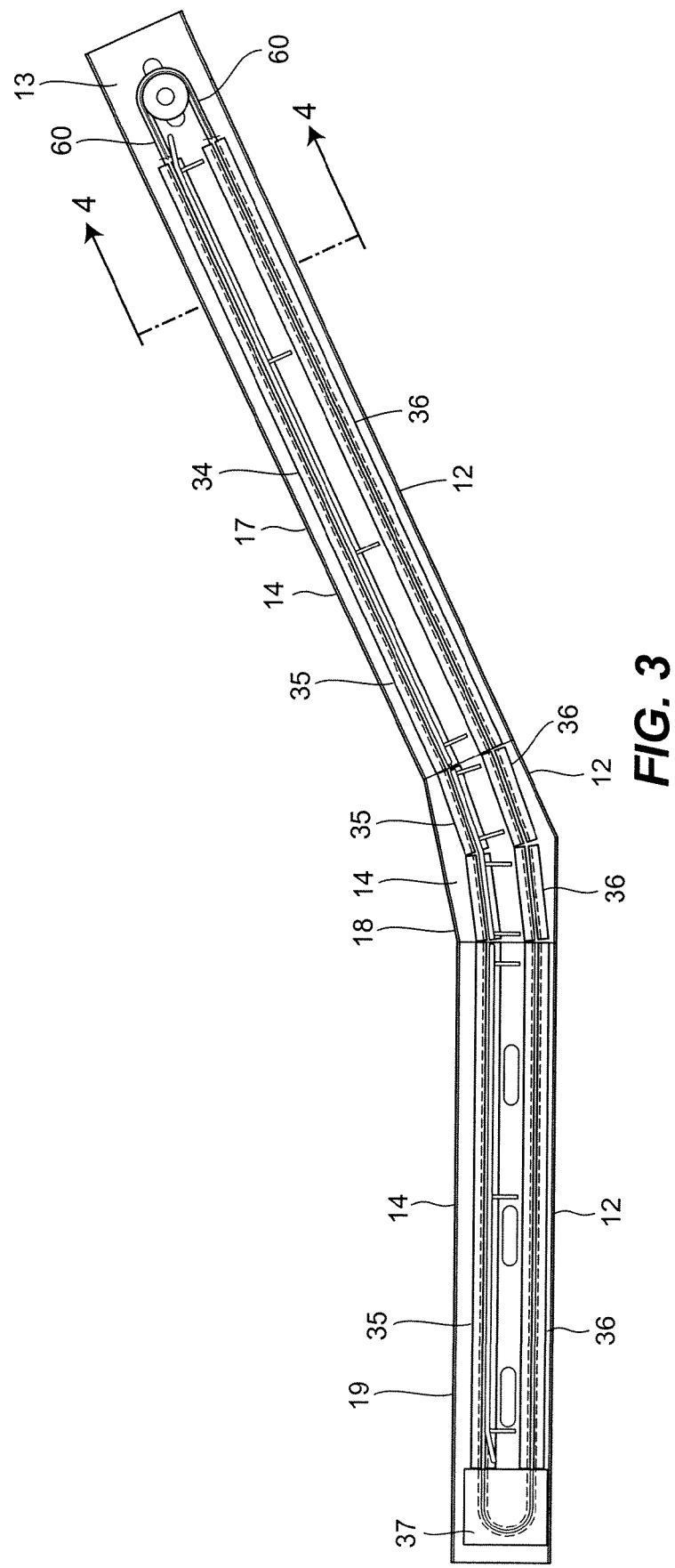
FIG. 3 shows a side section view of the conveyor apparatus taken along lines 3-3 in FIG. 1.

The base and sidewalls may, if desired, each be formed of one integral member, or, as illustrated in FIGS. 1-3, housing assembly 11 may be formed wherein base 12 and sidewalls 13, 15 are each formed of multiple components. For example, FIG. 1 illustrates an embodiment of a housing assembly 11 where sidewall 13 is formed by sidewall portions 17, 18, 19, and sidewall 15 is formed by sidewall portions 20, 21, 22. In the event base 12 and/or sidewalls 13, 15 are formed of a plurality of sidewall or base components, the components, in assembly, may be joined together in any suitable manner, e.g., bolts or welding, to form an integral housing assembly. Depending upon a particular application, sidewall portions 19, 22, for example, may include a plurality of slots 23 or other openings to permit the passage of fluid or other material.

Figure 4:
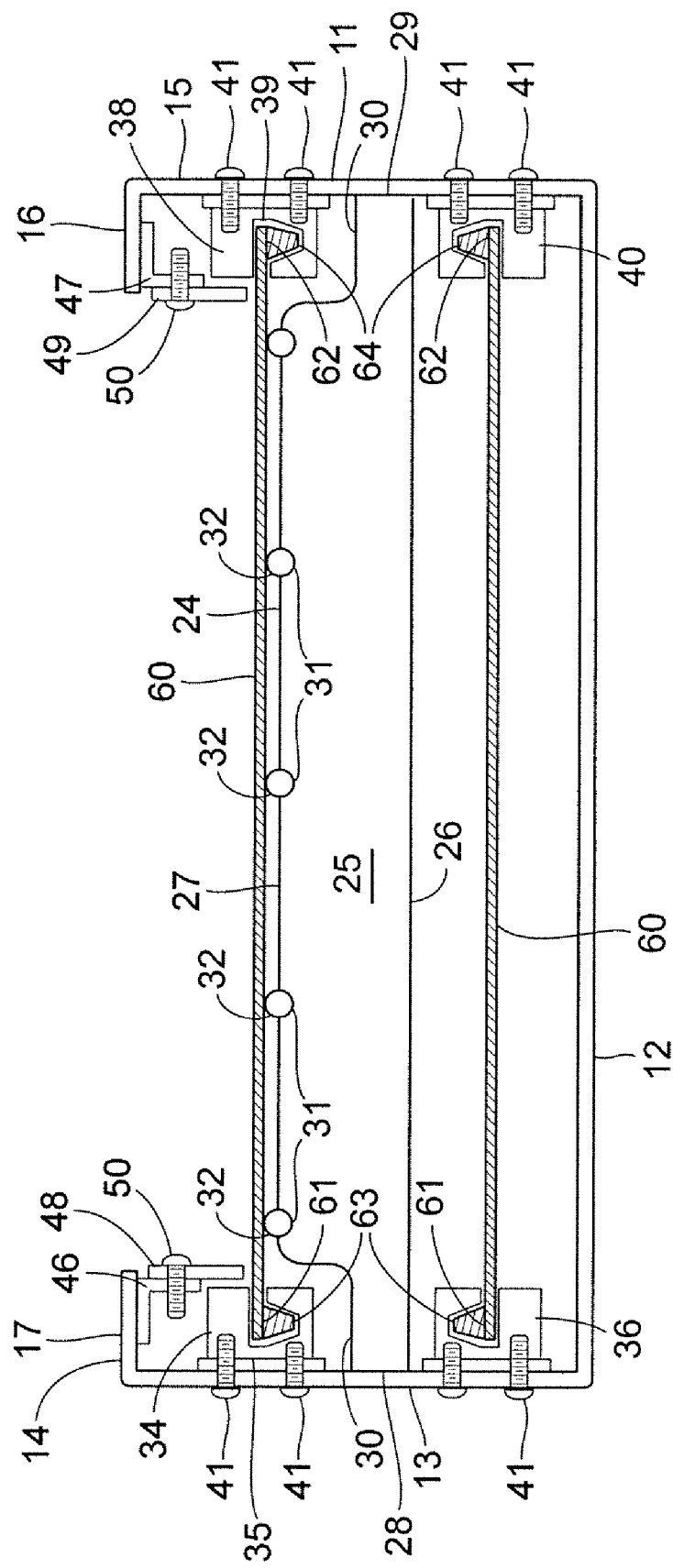
FIG. 4 shows an end section view taken along lines 4-4 in FIG. 3.

FIGS. 2 and 4 illustrate one embodiment of a conveyor belt support frame 24. Frame 24 comprises a plurality of space support bars 25 which may be made of metal or plastic, for example. Each bar 25 includes a bottom edge 26, top edge 27, and side edges 28, 29. Each bar is recessed at 30 contiguous to a bar side edge 28, 29. Additionally, spaced grooves 31 are located along the top bar edge 27. Bars 25 are each joined at its respective side edges to a respective frame sidewall. For example, as shown in FIG. 4, bar 25 is joined at side edge 28 in any suitable manner, e.g., welding, fastener, to sidewall 13 while bar side edge 29 is joined to sidewall 15.

Spaced conveyor belt support rods 32 traverse support bars 25. Each rod 32 is disposed in a plurality of substantially aligned grooves 31 in bars 25 and is retained in the grooves by welding or other suitable fastener retention assemblies.

A first track assembly 34 is located on the inner face of sidewall 13 and a second track assembly 38 is located on the inner face of sidewall 15. Track assembly 34 comprises one or more upper slotted track blocks 35, lower slotted track blocks 36 and a slotted track end block 37. Track assembly 38 comprises one or more upper slotted track blocks 39, lower slotted track blocks 40 and a slotted track end block, not shown, identical to end block 37. The upper and lower track blocks 35, 36, 39, 40 are releasably fastened to a respective sidewall 13, 15 by suitable screw fasteners 41.

Figure 14:
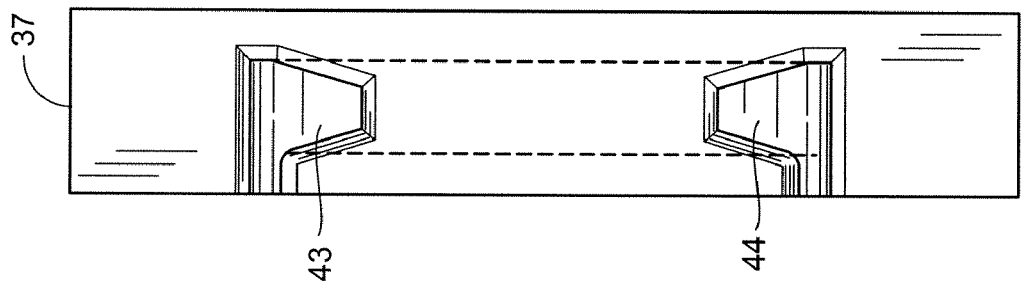
FIG. 14 shows an end view of the track end block shown in FIG. 13.
Figure 13:
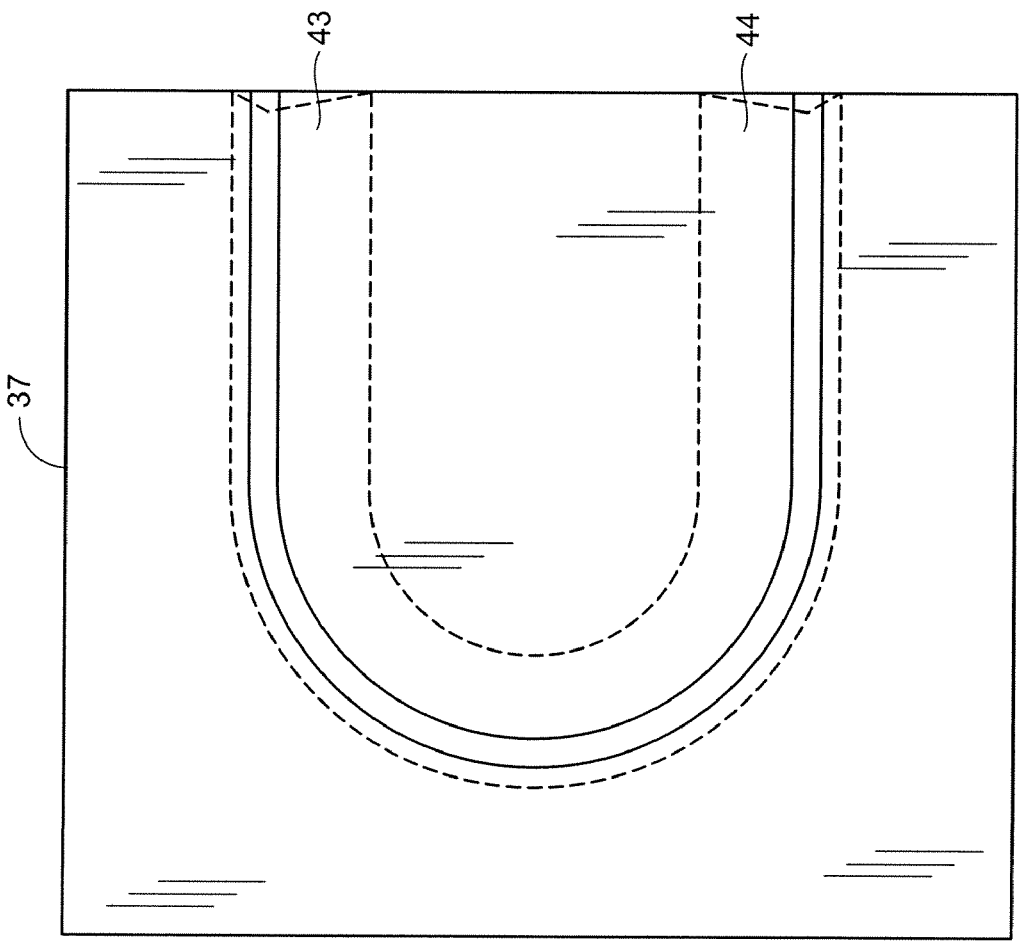
FIG. 13 show a track end block taken along lines 13-13 in FIG. 1.

Each track end block 37 includes a U-shaped slot. Track end block 37 is fastened to the inner face of sidewall 13 by means of suitable releasable screw fasteners 42 (compare with FIG. 2). Track end block 37 (FIGS. 13, 14) is positioned so that top slot 43 is substantially aligned with the slot in the upper track block 35 and lower slot 44 is substantially aligned with the slot in lower track block 36 whereby an elongated V-shaped slotted track is located on sidewall 13. Similarly, top slot in the track end block on sidewall 15 (not shown) is substantially aligned with the slot in upper track block 39 and bottom end block slot is substantially aligned with the slot in lower track block 40 to form an elongated V-shaped slotted track on sidewall 15.

Angle bar 46 (see FIG. 4) is joined to and depends from sidewall flange 14. Similarly, angle bar 47 is joined to and depends from sidewall flange 16. First guide rail or flashing 48 is attached to angle bar 46 by releasable screws 50 while second guide rail or flashing 49 is attached to angle bar 47 by releasable screws 50.

Conveyor belt 60 preferably is made of a flexible porous material, e.g., nylon. It is appreciated that, depending upon a particular application, belt 60 could be made non-porous and also of a different material. Belt 60 has two sides 61, 62. Chord member 63 is joined to belt side 61 while chord member 64 is joined to belt side 62. Each chord member is a flexible member and may be made of any suitable elastomeric, plastic or other material as, for example, Buna N rubber.

Chord members 63, 64 also are designed to have a defined shape as shown, for example, in FIGS. 5-10 that illustrate chord members having different defined shape embodiments. Presently, the preferred shape for chord members 63, 64 is the circular profile illustrated in FIGS. 5 and 20-22.

Figure 5:
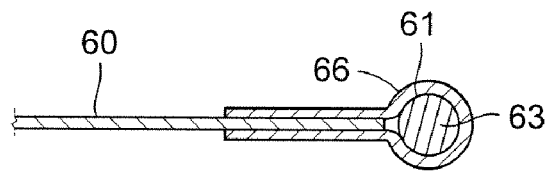
FIGS. 5-10 show partial end section views of conveyor belts having different chord member embodiments.
Figure 6:
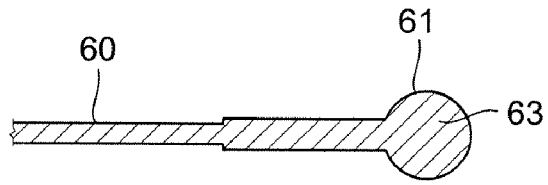
Figure 7:
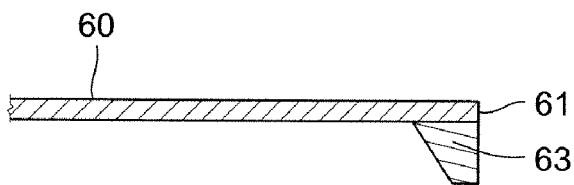
Figure 8:
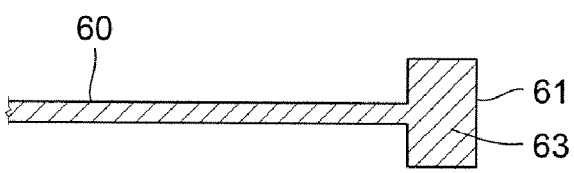
Figure 9:
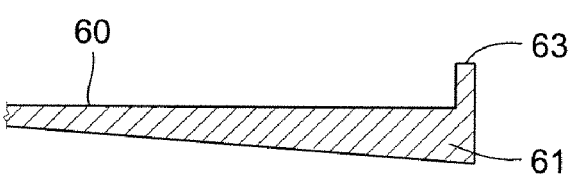
Figure 10:
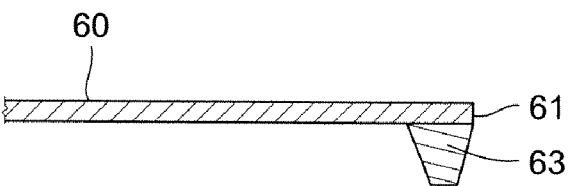

If desired, the chord members can be fabricated from the same material as belt 60. Belt 60 and chord members 63, 64 can, if desired, form one integral flexible structure (e.g., FIGS. 6, 8, 9) or the chord members can be separate members attached or otherwise joined, e.g., gluing, to belt 60 (FIG. 5, 7, 10). Turning to the chord member embodiment of FIG. 5, chord member 63 is enclosed within a flexible plastic loop member 66, which, in turn, is attached by gluing, sewing or other suitable connection to belt 60.

Belt 60 is intended to travel relative to track assemblies 34, 38. Chord member 63, which is adapted to mate with the configuration of slots 43, 44, is inserted for movement within track assembly 34 while chord member 64 is inserted for movement within track assembly 38.

A chord member may be inserted into a track assembly commencing at the end of a track assembly located near drive assembly 70, to be described. After inserting the chord member through a track assembly sidewall and track end block, the ends of the chord member are fastened or joined together by stitching, gluing or other suitable method to form an endless chord member. The ends of conveyor belt 60 also are fastened or joined together by gluing, stitching or other suitable method to form endless conveyor belt 60.

Upon actuation of the drive assembly 70, endless belt 60 and endless chord members 63, 64 travel along the length of a particular conveyor.

Drive assembly 70 comprises a conventional motor 71 and gear box 72 connected to the motor to form a motor assembly. Drive shaft 73 (FIGS. 15 and 16) is coupled to a shaft extending from gearbox 72 whereupon actuation of motor 71, drive shaft 73 will rotate. Drive shaft 73 is disposed within spaced bearing assemblies 74, 75.

Figure 12:
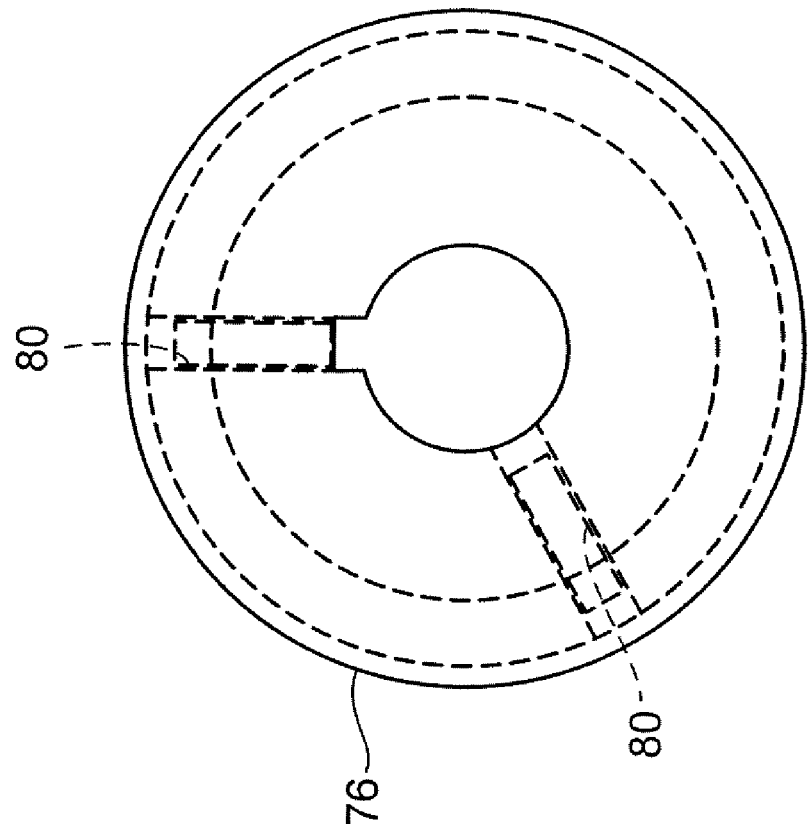
FIG. 12 shows a side view of the conveyor belt drive sheave of FIG. 11.
Figure 11:
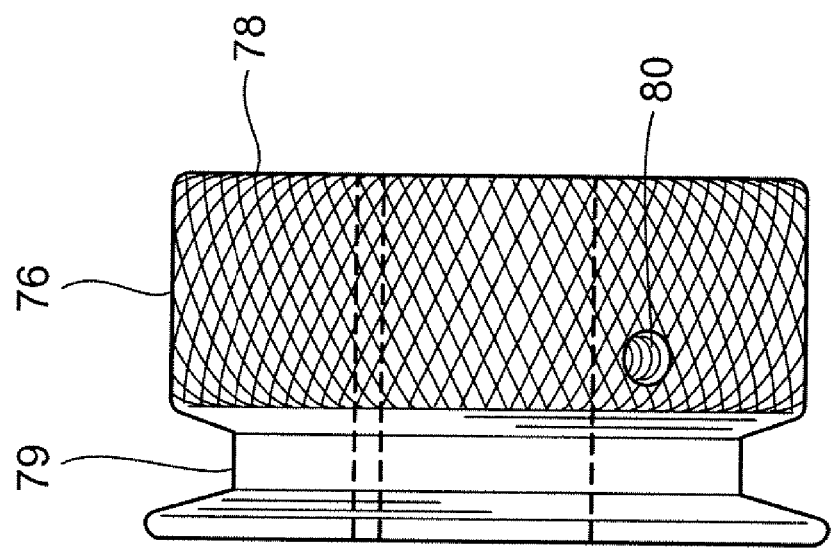
FIG. 11 shows a conveyor belt drive sheave adapted to seat on a conveyor belt drive shaft and receive a chord member.

A pair of spaced drive sheaves 76, 77 are releasably attached to drive shaft 73. As illustrated in FIGS. 11 and 12, each sheave preferably includes a knurled surface 78 and a recessed portion 79 that preferably is shaped to conform to and mate substantially with the shape of chord members 63, 64. Screw holes 80 are adapted to receive a suitable screw, not shown, to releasably fix sheaves 76, 77 to drive shaft 73.

Belt tensioning assembly 82 (FIG. 16) preferably includes a pair of spaced angle bars 83, 84 welded or otherwise joined to the outer faces of sidewall 13. Bearing assembly 75 is releasably bolted at 85 to plate 86 and is held in place by and adapted to slide within angle bars 83, 84. A second pair of angle bars 87, 88 is joined to sidewall 15. Bearing assembly 74 is releasably bolted at 89 to plate 90. Plate 90 is retained within and slides relative to angle bars 87, 88.

Figure 15:
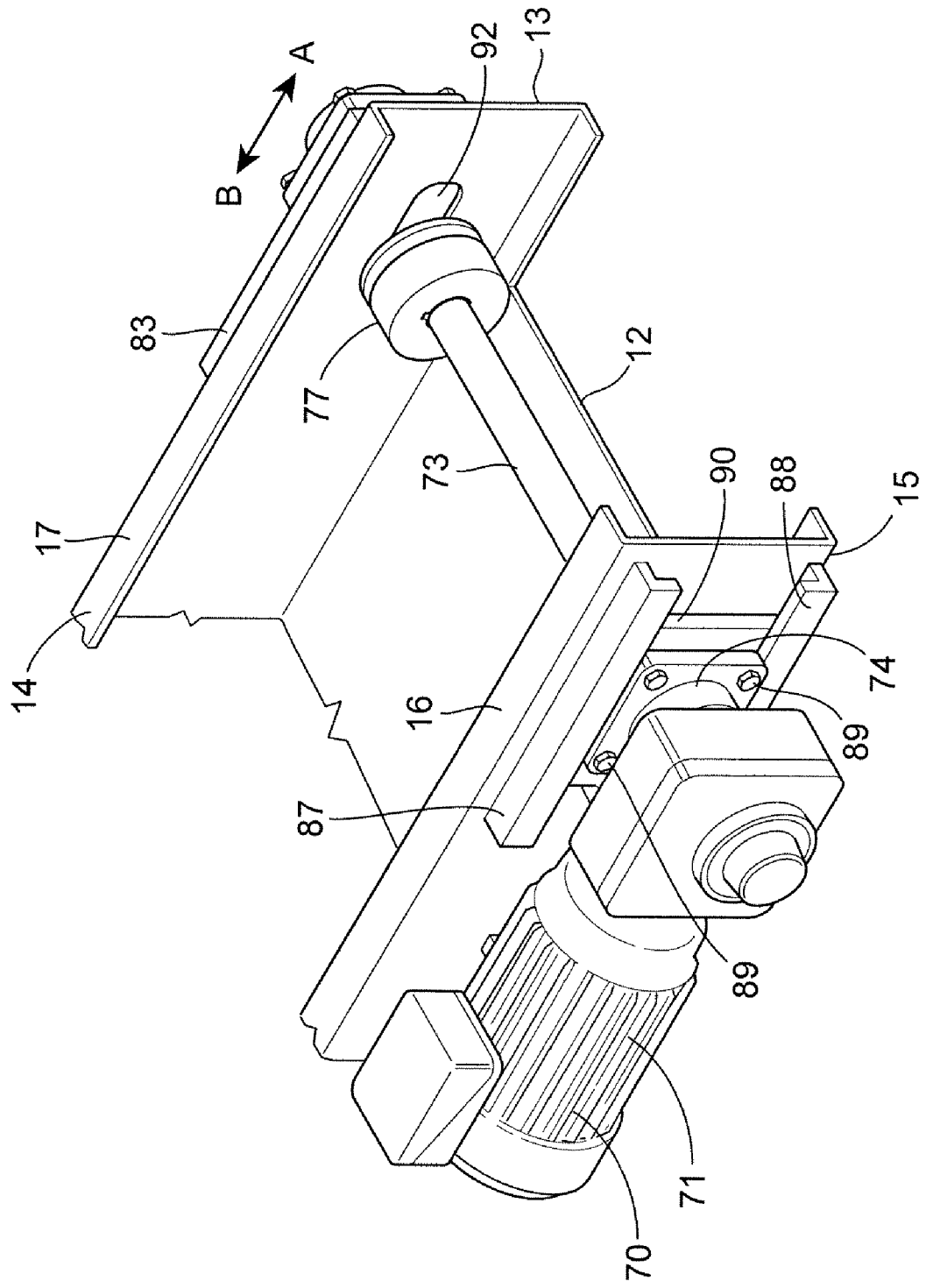
FIG. 15 shows a first partial perspective view illustrating the conveyor drive assembly.
Figure 16:
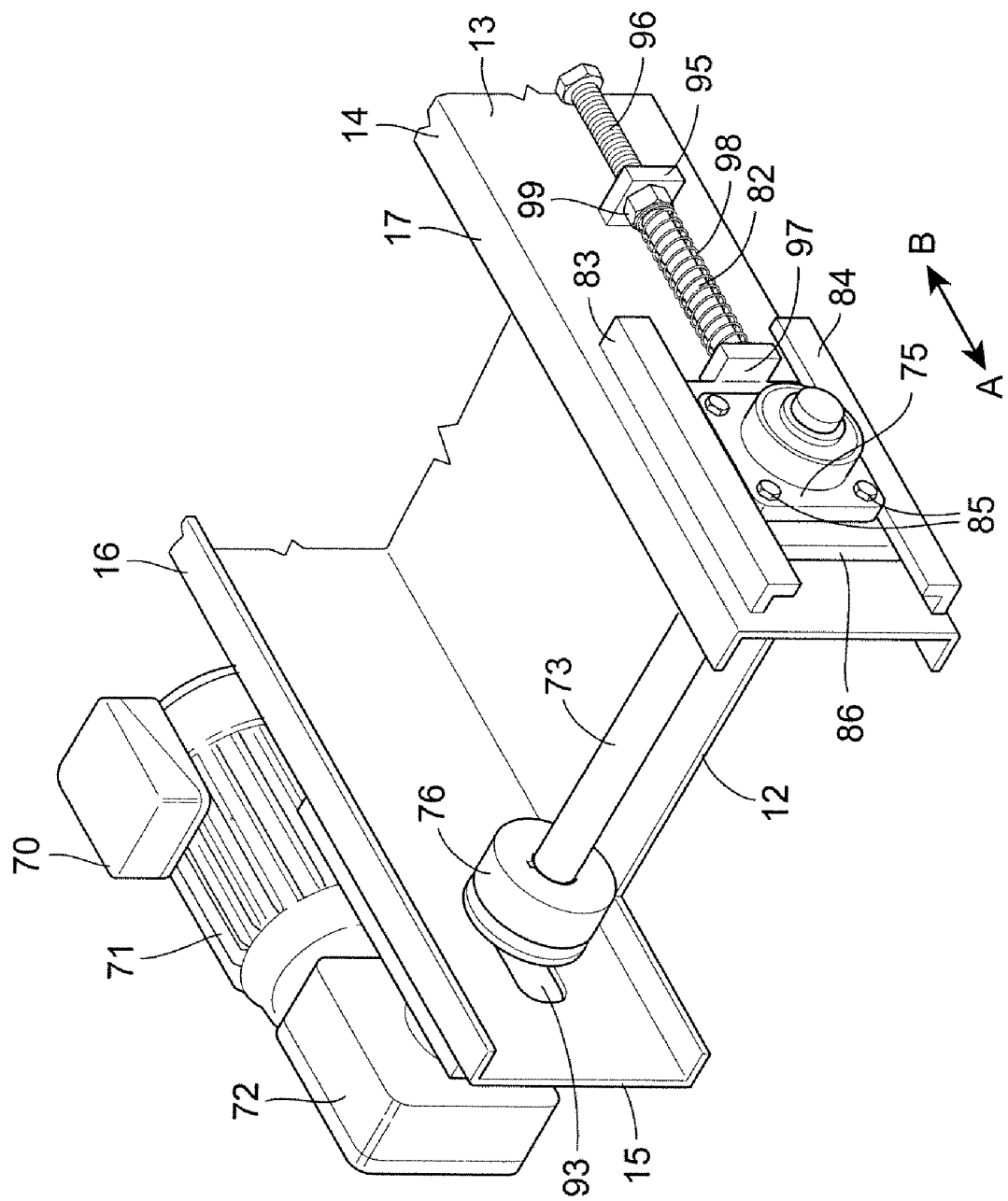
FIG. 16 shows a second partial perspective view of the conveyor belt drive assembly and tensioning assembly viewed from the side opposite that shown in FIG. 15.

Sidewall 13 is slotted at 92 while sidewall 15 is slotted at 93. Drive shaft 73, as illustrated in FIGS. 15, 16 extends through sidewall slots 92, 93. Tensioning assembly 82 is attached to sidewall 13 as shown, for example, in FIG. 16. Tensioning assembly 82 includes threaded block 95 welded to sidewall 13. A partially treaded bolt 96 is threaded onto block 95. Pad 97 is fixed to the outboard end of bolt 96 and compression spring 98 and nut 99 are disposed on bolt 96 between block 95 and pad 97. Upon turning bolt 96 in one direction, pad 97 will contact and move plate 86 along with plate 90 causing drive shaft 73 to move in the direction of arrow "A" (FIGS. 15, 16). As drive shaft 73 moves in the direction of arrow "A," sheaves 76, 77 contact belt chord members 63, 64 in sheave recesses 79 causing tension to occur in belt 60. When bolt 96 is turned in the opposite direction, drive shaft 73 can move in the direction illustrated by arrow "B," whereupon the tension is released and belt 60 is in a more relaxed position.

In operation, endless belt 60 travels along its length relative to stationary track assemblies 34, 38. Because of the arrangement whereby chord members 63, 64 have a shape which substantially conforms to and mates with the slotted keyhole shape in track assemblies 34, 38, it is believed that a substantial sealing arrangement is established between the belt and track assemblies. Further, guide rails or flashings 48, 49 serve to guide wet chips or other materials being conveyed along the length of the conveyor and also assist in precluding conveyed material from falling from the sides of conveyor belt 60 or contacting a chord member disposed in a track assembly.

While the conveyor system has been disclosed with respect to the conveying of wet chip materials, it is appreciated that any number of other similar materials could be expected to be employed with this conveyor apparatus.

Figure 17:
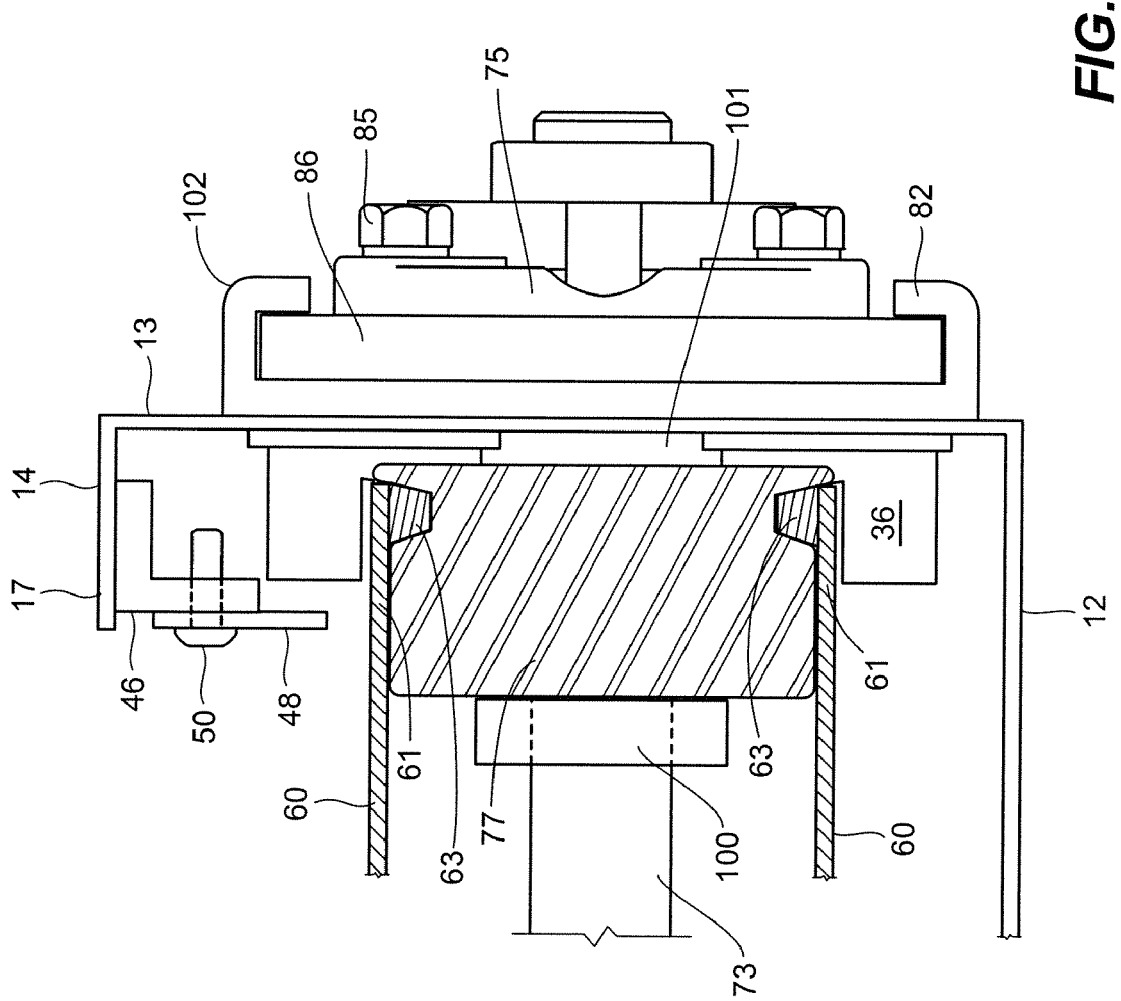
FIG. 17 shows a partial section end view, viewed from the conveyor end opposite that shown in FIG. 4, of a second drive sheave assembly and tensioning assembly embodiment with a belt chord member disposed within a mating groove formed in the sheave.
Figure 18:
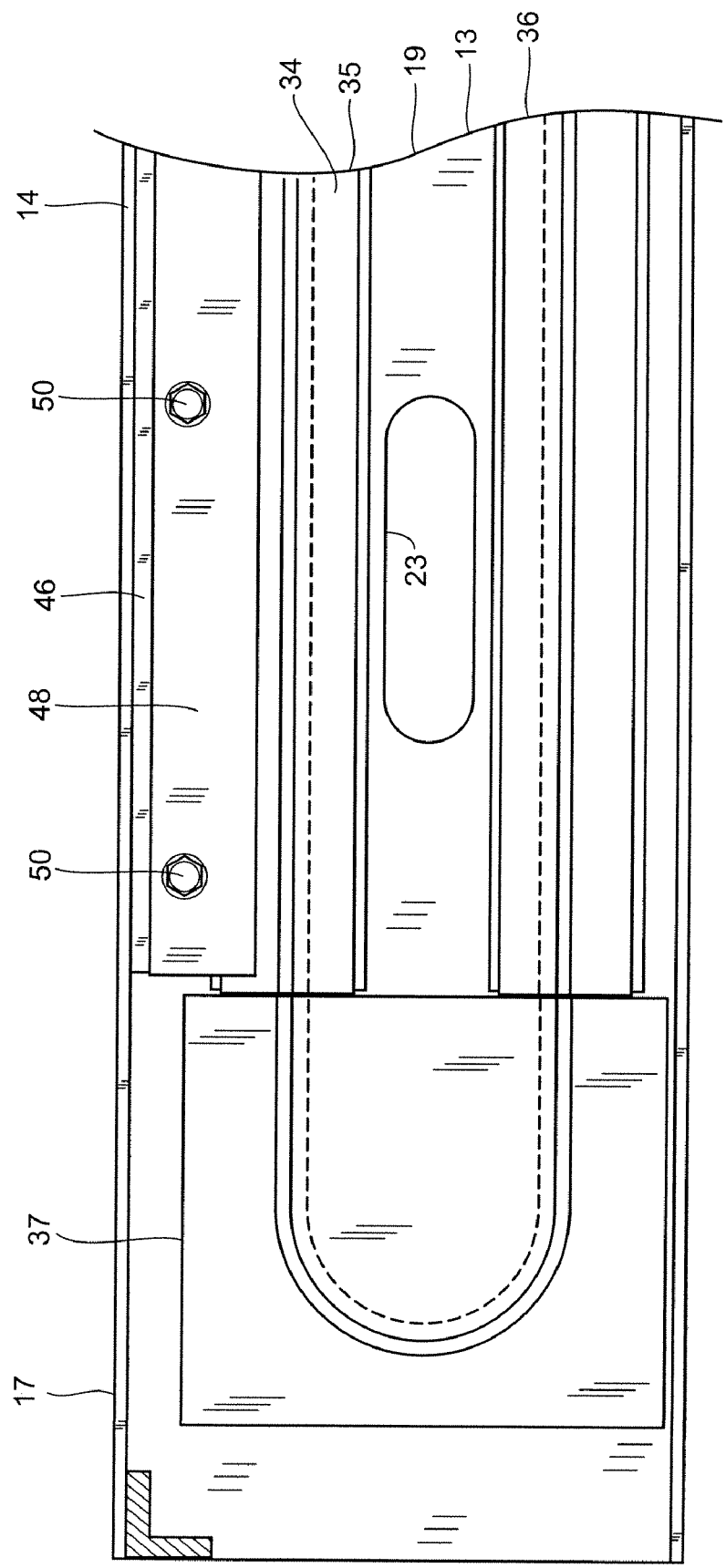
FIG. 18 shows a partial side view of one of two conveyor belt track and end block assemblies.

Similarly, it has been described that sheaves 76, 77 can be attached to drive shaft 73 (FIG. 12). If desired, as illustrated by the embodiment shown in FIG. 17, the sheaves can be maintained on shaft 73 by means of bushings 100, 101 that are releasably attached to shaft 73 and maintain a sheave between them.

Instead of employing angle bar assemblies 83, 84 and 87, 88 (FIG. 15), flanged plate 102 (FIG. 17) can be employed to hold plates 86, 90 in place on the frame sidewalls while allowing the plates to slide relative to the sidewalls.

Figure 19:
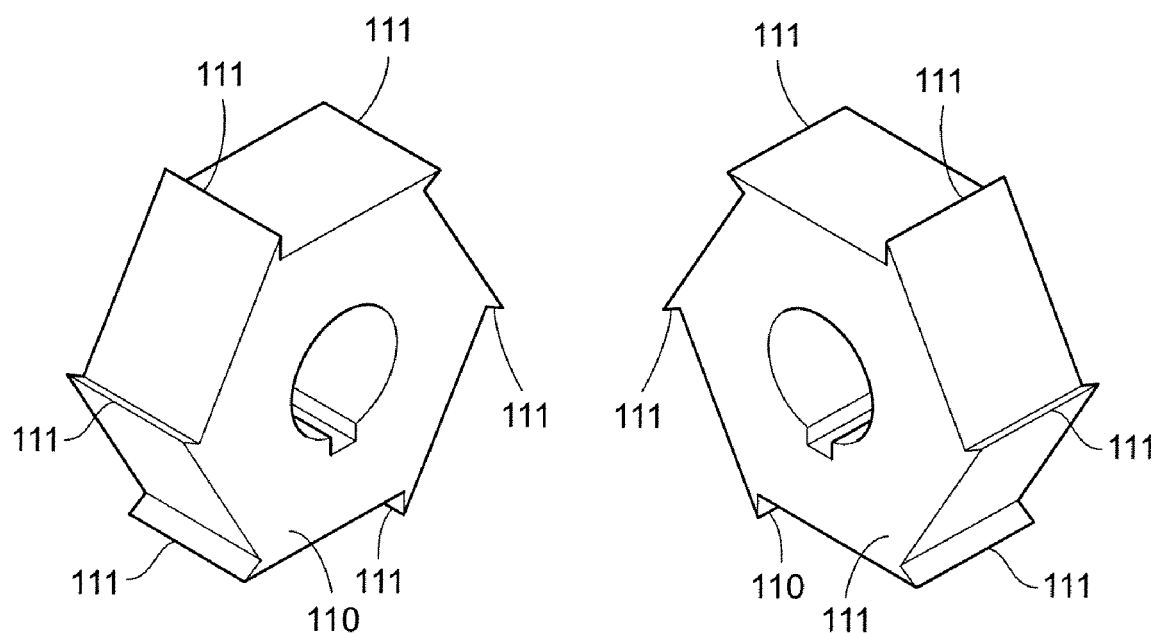
FIG. 19 shows another embodiment of the drive sprocket adapted to seat on a conveyor belt drive shaft.
Figure 20:
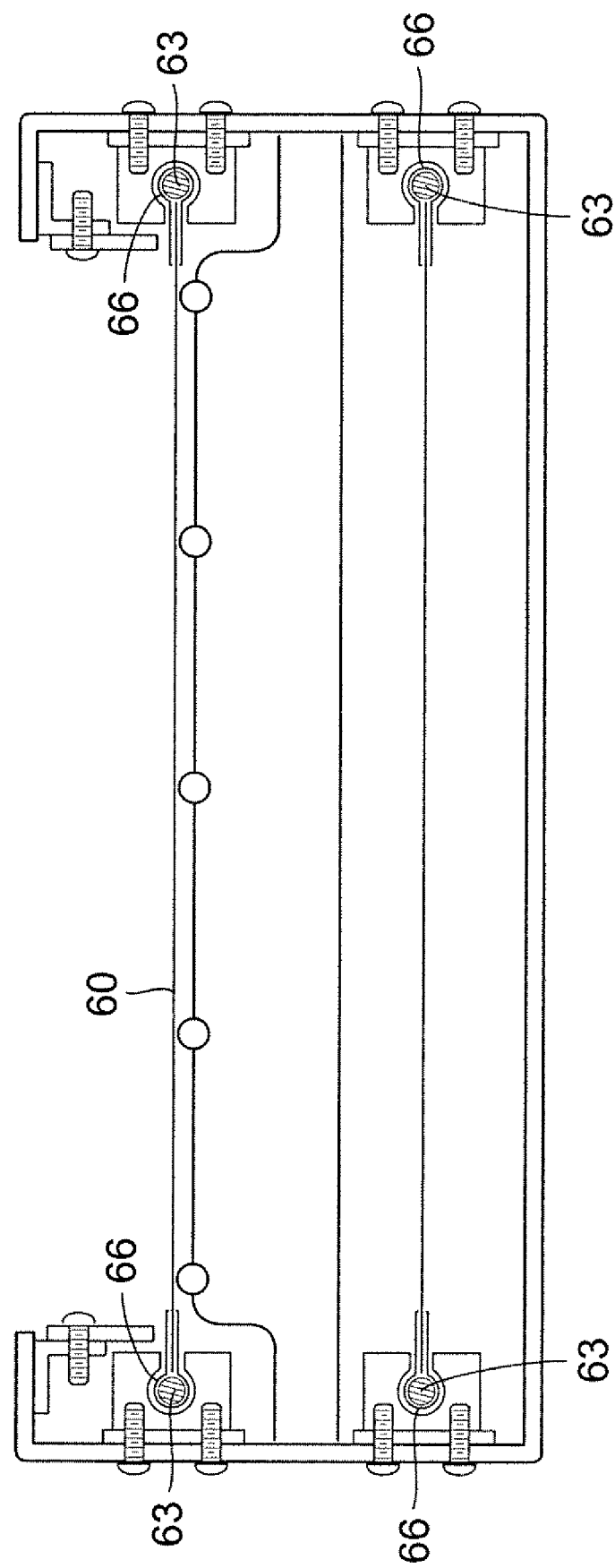
FIG. 20 shows an end section view taken along lines 4-4 in FIG. 3 except that the chord member comprises the chord member embodiment of FIG. 5.
Figure 22:
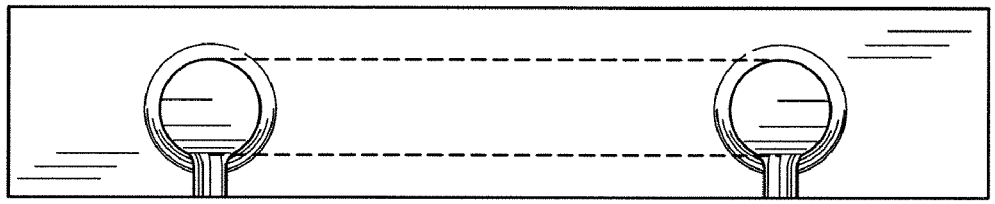
FIG. 22 shows an end view of the track end block shown in FIG. 21.
Figure 21:
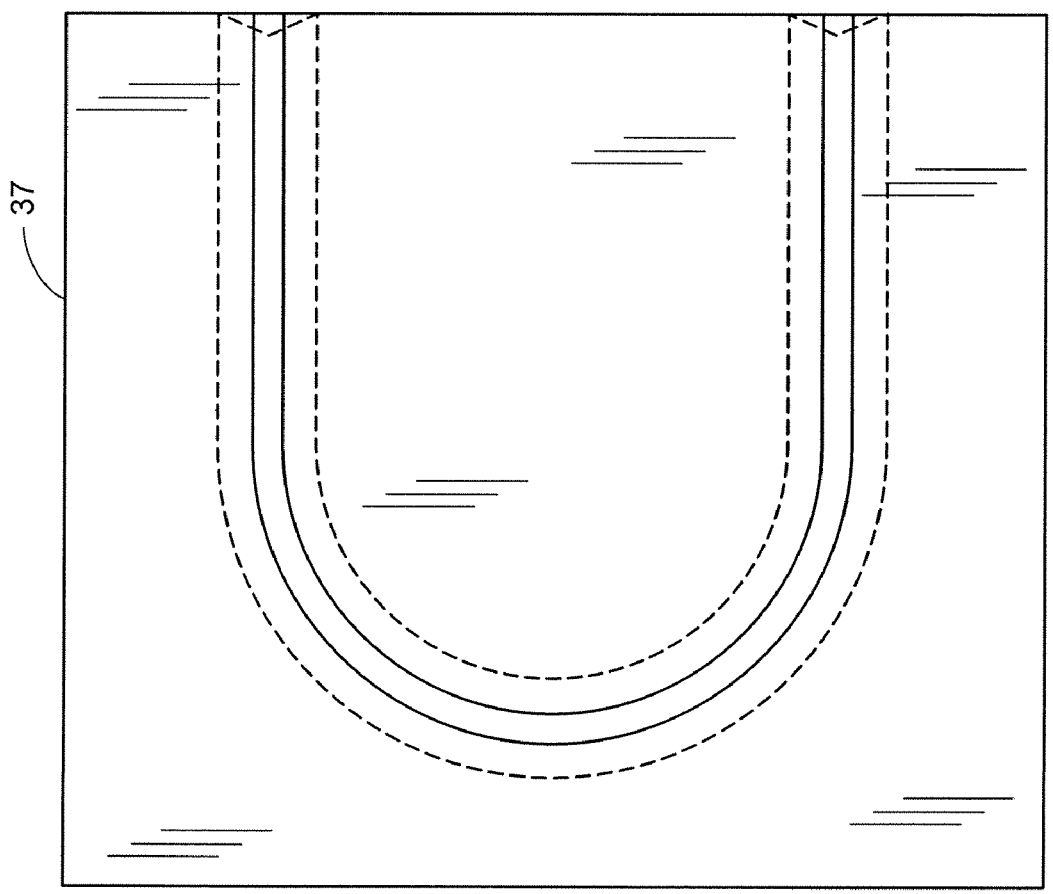
FIG. 21 shows a track end block taken along lines 13-13 in FIG. 1 except that the end block top slot and bottom slot are shaped to configure and mate with the chord member embodiment illustrated in FIG. 5.

Further, it is contemplated that, if desired, sheaves 76, 77 could be replaced with a sheave of the type shown in FIG. 19, sheave 110. Sheave 110 is formed to employ a plurality of spaced notches 111 which contact conveyor belt 60. Sheave 110 could be knurled, if desired.

Figure 23:
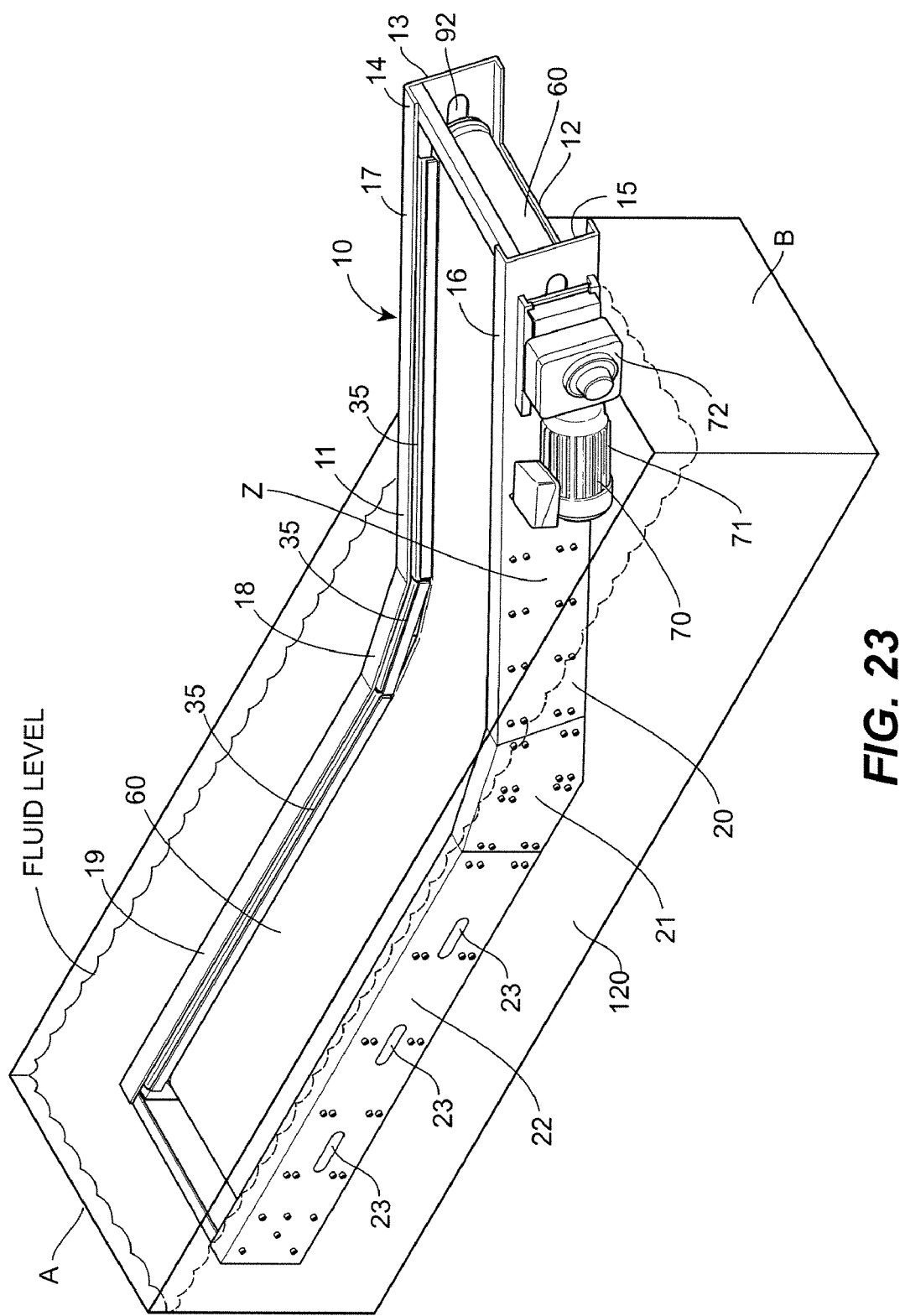
FIG. 23 shows a further embodiment of a portion of the conveyor apparatus of FIG. 1 disposed in a container or trough, a portion of which is illustrated, containing a fluid having solid particles therein.

FIG. 23 shows the conveyor system of FIG. 1 partially disposed in a trough 120, a portion of which is illustrated, containing a fluid having wet chips or some other solid particulate therein. A vacuum is pulled within that portion of conveyor apparatus 10 disposed below the fluid level in trough 120. More specifically, referring to FIG. 4, a vacuum is pulled within that portion of the conveyor assembly, i.e., sidewalls 13, 15, track assemblies 34, 38, and conveyor belt 60, that serve to form a substantially sealed environment. The solids will be pulled onto (and, potentially, may even become semi-embedded in) the belt 60 and travel on the endless conveyor belt disposed horizontally in the fluid trough. Then conveyor belt 60 exits the fluid as illustrated at Z in FIG. 23, the solid particulate can be scraped or otherwise removed from conveyor belt 60.

Additional embodiments of conveyor apparatuses according to the present disclosure are illustrated in FIGS. 24-33.

Figure 24:
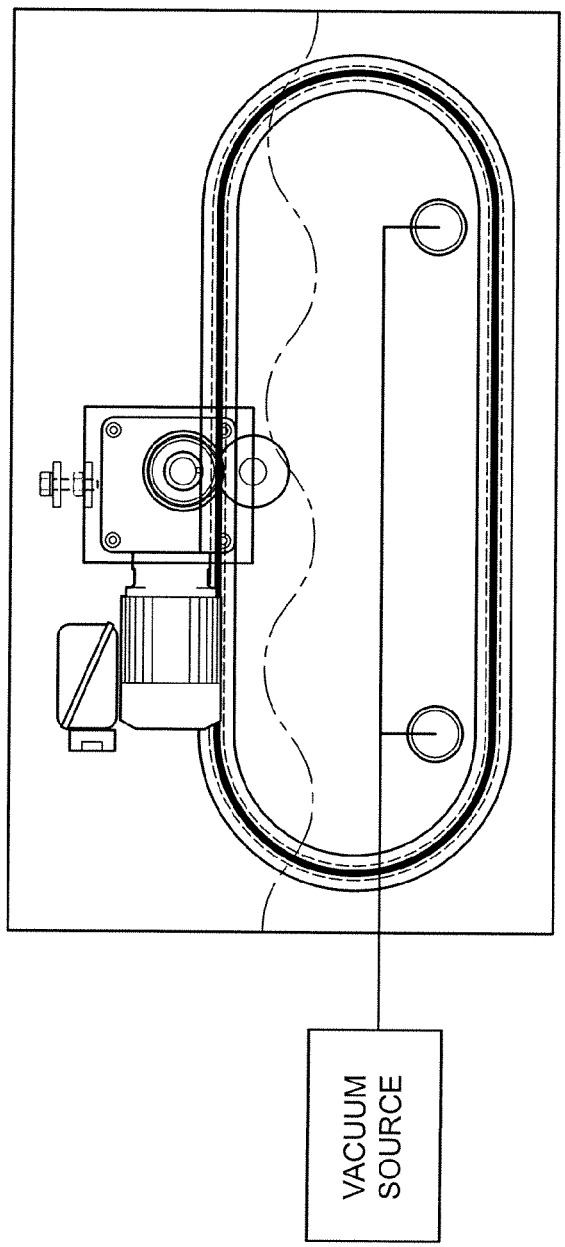
FIGS. 24 and 25 show a further embodiment in which a horizontal conveyor system employs a moving filter belt system for filtering solids out of a fluid containing solids therein.
Figure 25:
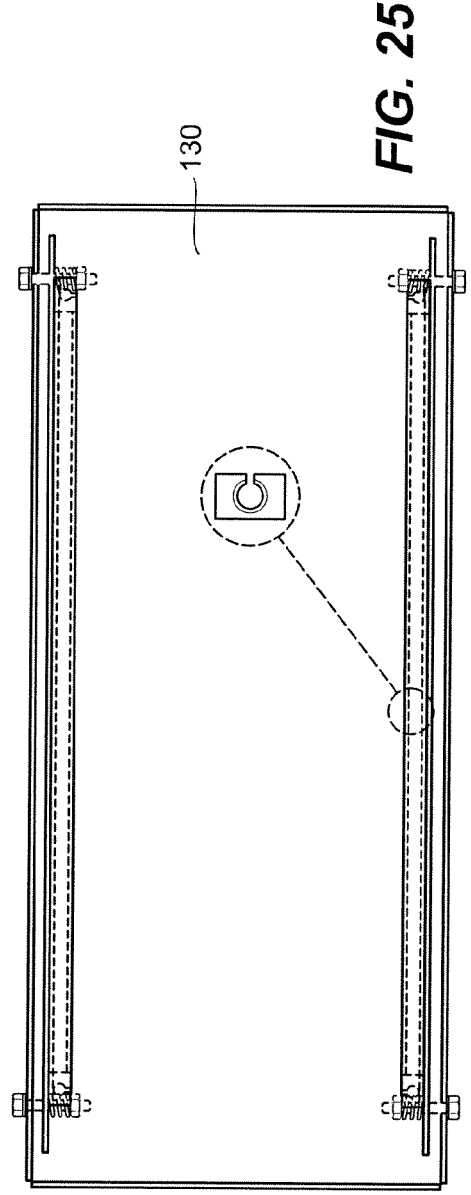

In the embodiment of FIGS. 24 and 25, the horizontal oblong-shaped conveyor belt assembly is partially disposed in a fluid trough. Again, a vacuum system is employed to pull a vacuum on the underside of conveyor belt 130 whereby solids traveling in the fluid trough are filtered out of the fluid passing through the porous conveyor belt. The solids remain on and travel along on the conveyor belt. When the conveyor belt and solids exit the fluid trough, the solids on the belt can be scraped or removed from the belt.

Figure 26:
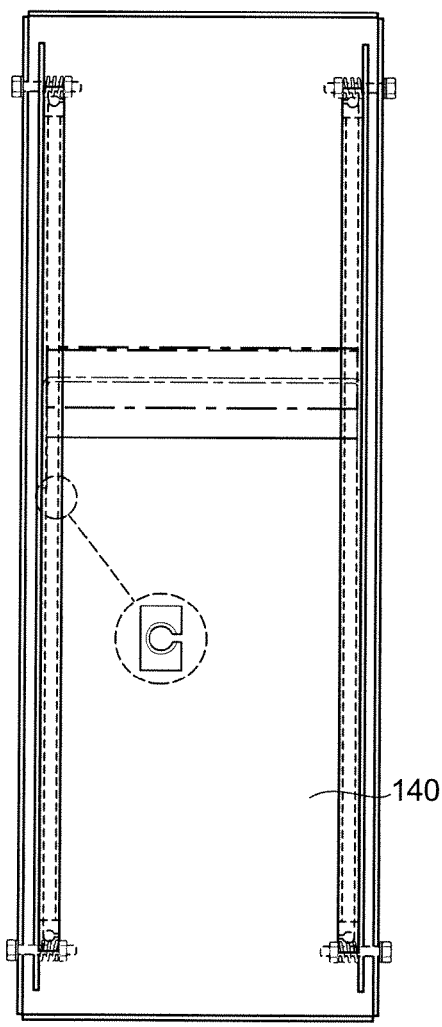
FIGS. 26 and 27 show a vertical conveyor system employing a moving filter belt system for filtering solids out of fluid containing solids therein.
Figure 27:
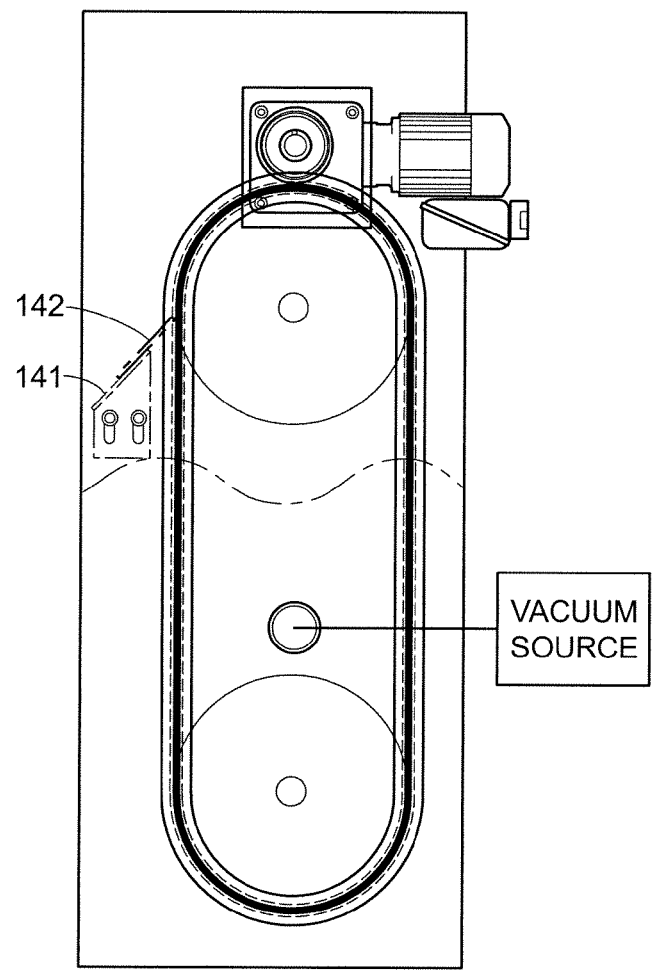

In the embodiment of FIGS. 26 and 27, an oblong-shaped conveyor system, similar to the conveyor embodiment of FIG. 25, is partially disposed in a fluid trough. The oblong-shaped conveyor of FIGS. 26 and 27 differs from that of FIG. 25 in that the conveyor belt 140 is oriented in a vertical direction. Additionally, scraper apparatus 141 having a scraper 142 is disposed contiguous to belt 140. Scraper 142 scrapes the solids filtered out of the fluid from conveyor belt 140.

Figure 29:
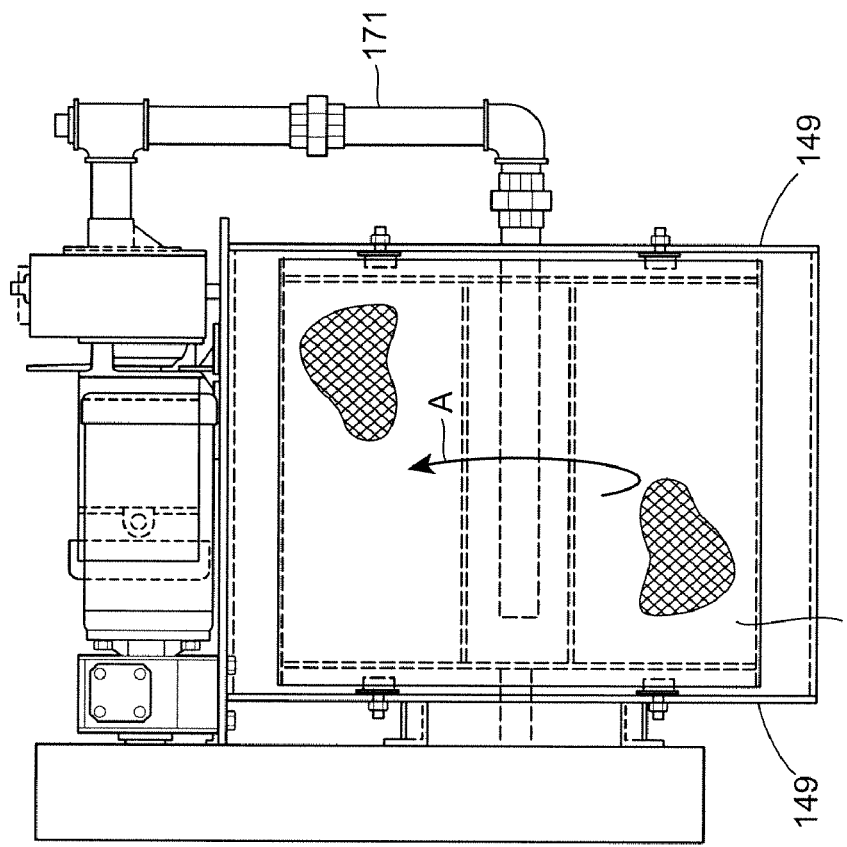
FIGS. 28 and 29 show a further embodiment of a filter system in which each of two spaced chord members attached to a cylindrical shaped porous conveyor belt is disposed in a slot of a rotatable end member.
Figure 28:
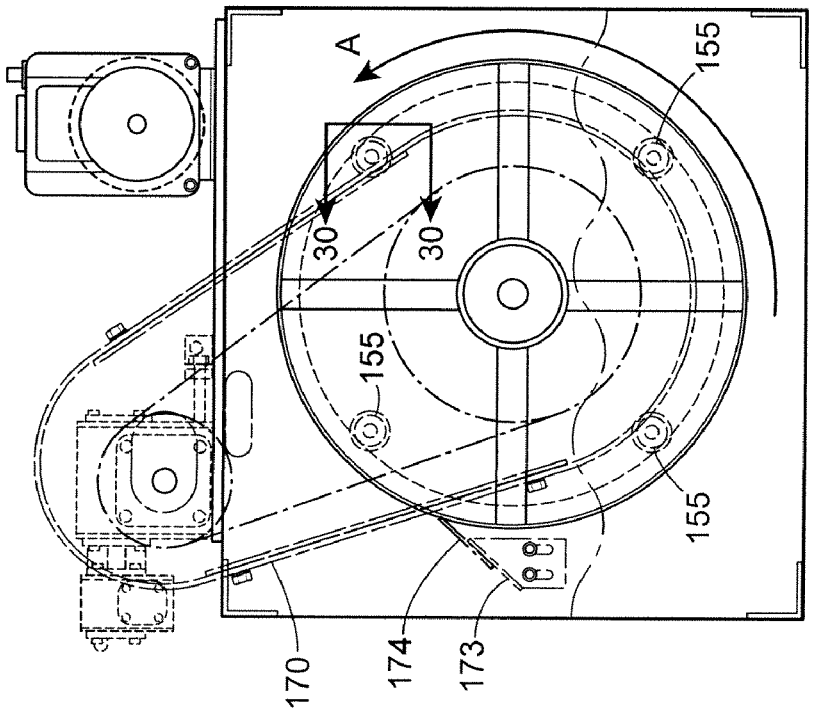
Figure 30:
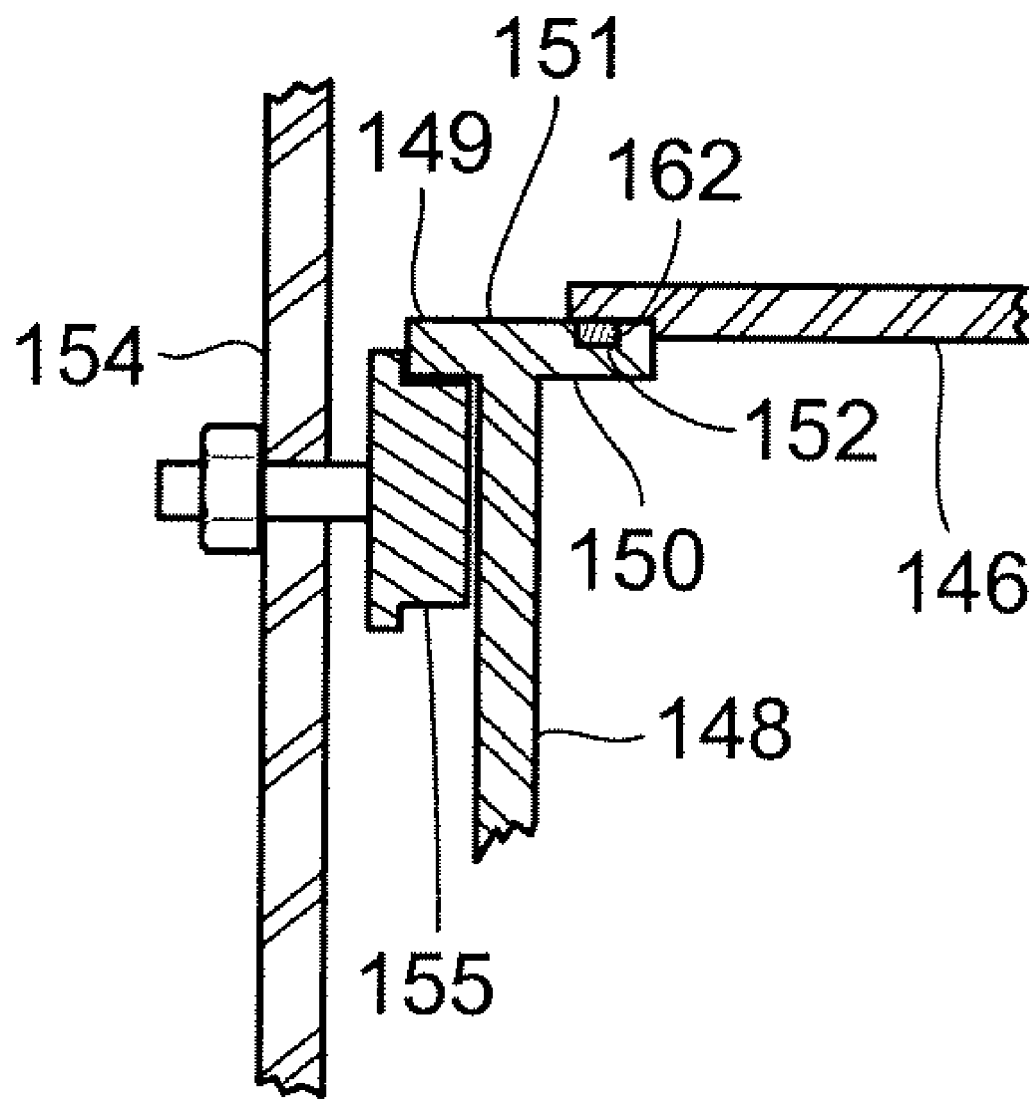
FIG. 30 shows a partial section view taken along lines 30-30 in FIG. 28.

In the embodiment of FIGS. 28 and 29, a cylindrically-shaped conveyor belt 146 is partially disposed in a fluid containing solids. Two spaced conveyor end plates 148, see FIG. 30, each include a flange 149 located at the outer edge of each circular end wall. The flange includes inner flange portion 150 and outer flange portion 151. Inner flange portion 150 is grooved or slotted to form an endless keyhole slot 152 on the outer surface of the flange. The surface of flange portion 151 is adapted to serve as a cam follower.

A plurality of cams 155 are attached for rotation to each of the spaced vertical sidewalls 154 of the conveyor belt frame support. Each cam is adapted to contact a cam follower on flange portion 151. A sprocket chain drive assembly 170 is employed to rotate the spaced end plates 148, the later being connected together by suitable spaced tie rods, not shown.

Conveyor belt 146 is a flexible porous member having chord members 162 located at each belt side edge. Each chord member 162 is adapted to seat within a slot 152 to form a seat between an end plate flange and a belt side edge.

Upon actuation of drive assembly 170, end plates 148 are rotated and the cam followers travel on spaced cams 155. The circularly shaped conveyor belt 146 rotates in the direction shown by arrow A and passes through a fluid trough containing solids. A vacuum apparatus 171 serves to pull a vacuum on the underside of belt 146 whereby solids in the fluid are pulled onto the moving conveyor belt 146. After the belt and attached solids exit the fluid trough, they travel in the direction of arrow A to a scraper apparatus 173 where a scraper 174 scrapes or removes the solids from belt 146.

Figure 31:
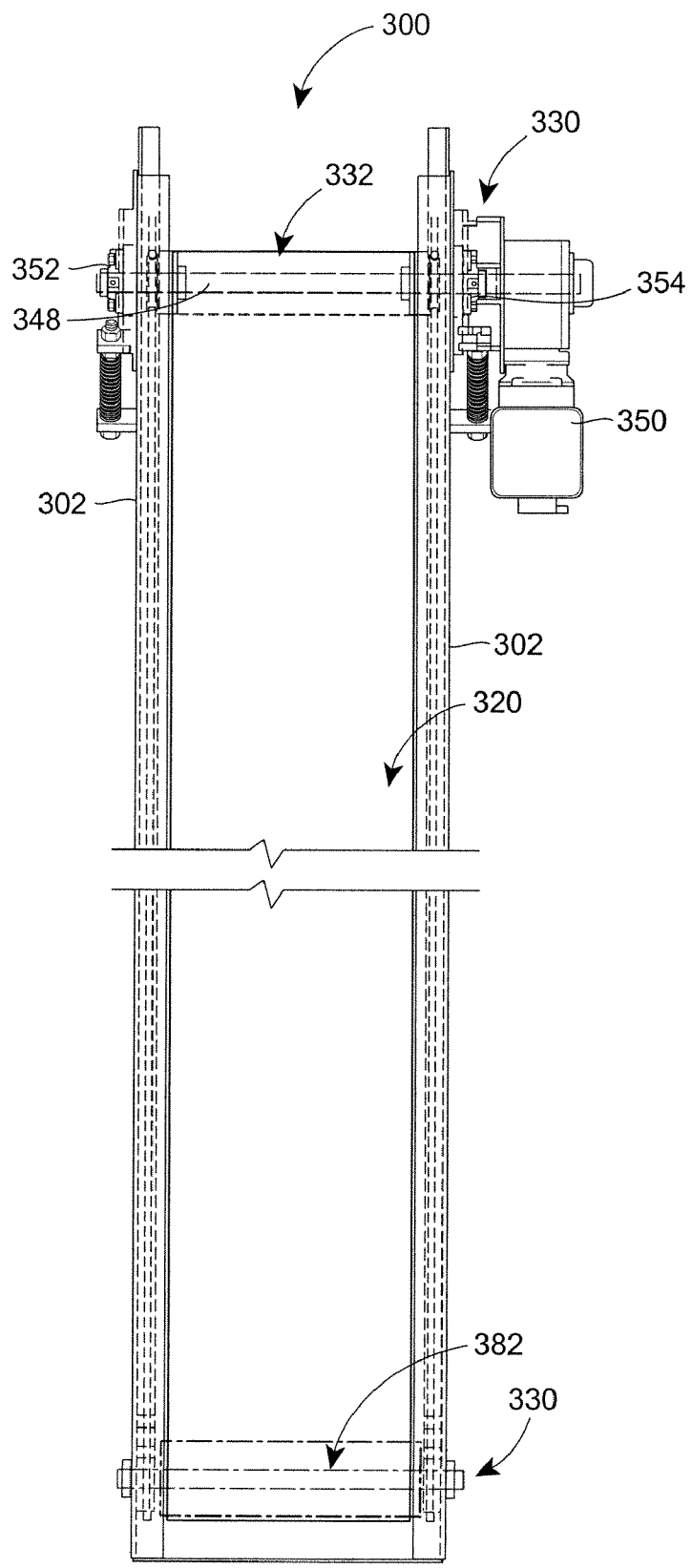
FIG. 31 shows a top view of another embodiment in which the conveyor system employs a moving belt.
Figure 32:
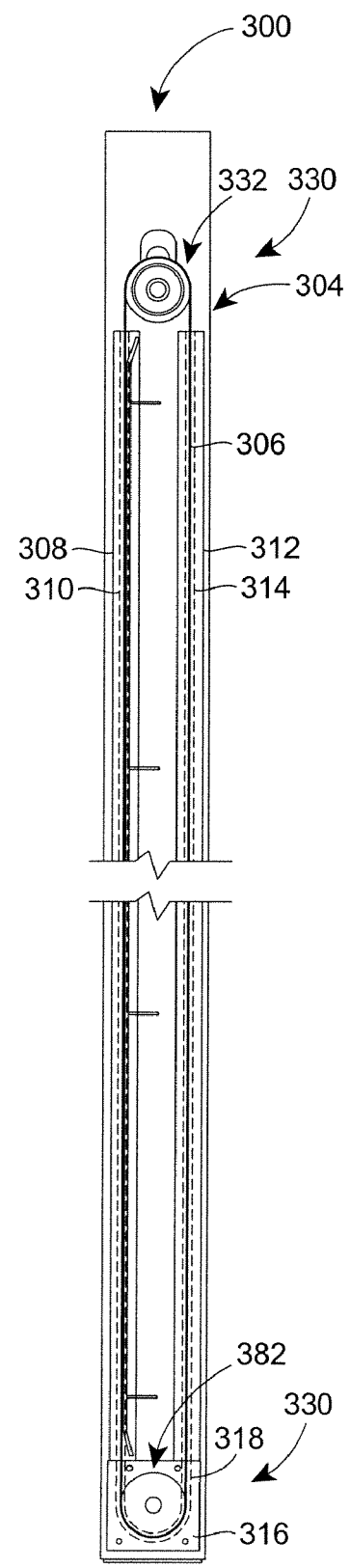
FIG. 32 shows a side view of the embodiment of FIG. 31.
Figure 33:
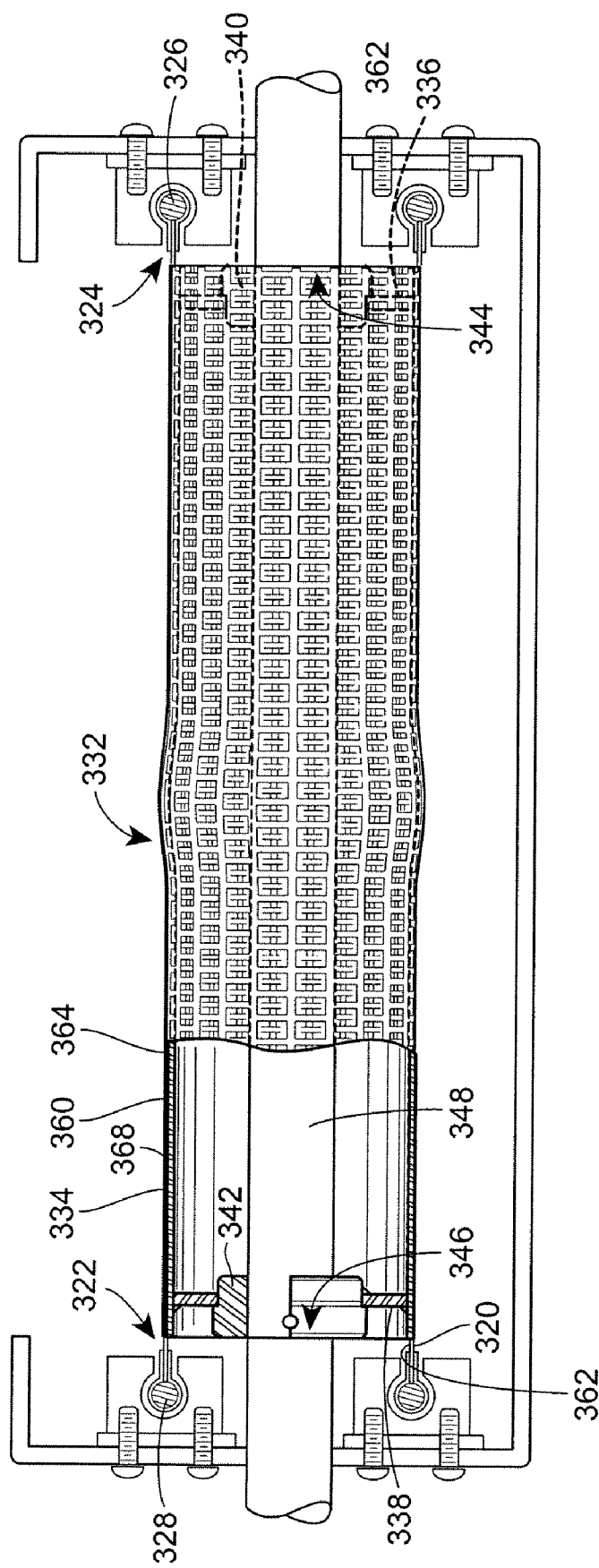
FIG. 33 shows an end sectional view of the embodiment of FIG. 31.

A further embodiment of a conveyor system 300 according to the present disclosure is illustrated in FIGS. 31-33. The system 300 may have a frame assembly including opposing frame sidewalls 302 (see FIG. 31), each of which may have attached thereto a track assembly 304 that has a slot 306 defined therein (see FIG. 32). The sidewalls 302 may be made of metal, and the track assembly 304 may be made of plastic or metal, for example. As best seen in FIG. 32, each track assembly 304 may include straight, upper track blocks 308 having a straight slot 310, straight, lower track blocks 312 having a straight slot 314, and an end track block 316 with a U-shaped slot 318. The slots 310, 314, 318 may be generally circular in cross-section (see FIG. 33).

A belt 320 may also be included in the system 300, and may be made of a flexible porous material, e.g., nylon, although other materials may be used as well. The belt 320 may have opposing sides 322, 324, and each side 322, 324 may have a chord member 326, 328 joined thereto (see FIG. 33). The chord members 326, 328 may be flexible, and may be made of any suitable material, such as elastomers, plastics and the like. The chord members 326, 328, as illustrated, have a circular cross-section, and may be attached to the respective side 322, 324 by wrapping a piece of material over the chord member 326, 328 and attaching the material to one of the sides 322, 324 of the belt 320 similar to the embodiment of FIG. 5. The belt 320 may have ends that are fastened together, by fasteners such as staples, for example, or otherwise joined together to thereby define an endless, or continuous, conveyor belt 320. Similarly, the chord members 326, 328 may have ends that are joined to form an endless, or continuous, conveyor belt.

It will be recognized that other cross-sections may be used for the slot 306 and the chord members 326, 328, such as the various cross-sections illustrated in FIGS. 6-10, for example. However, the cross-sections should be similar in shape such that the chord members 326, 328 and slots (or tracks) 306 substantially mate within one another when the chord members 326, 328 are disposed within the tracks 306. In fact, it is believed that the mating between chord members 326, 328 and tracks 306 may provide a dynamic seal when the chord members 326, 328 travel relative to the tracks 306, thereby limiting movement of the material transported on the belt 320 into contact with the chord members 326, 328.

The system 300 differs from those embodiments shown in FIGS. 1-30 in that drive assembly 330 includes a drive pulley assembly 332, including a pulley such as the S.D. Series Type "D" crowned pulley commercially available from The Chantland Company of Humboldt, Iowa. As illustrated in FIG. 33, the pulley assembly 332 may include a hollow, cylindrical tube body 334 with opposing endplates 336, 338. The body 334 may be slightly tapered between the center of the body and each of the endplates 336, 338. Moreover, the length of the pulley assembly 332 between the opposing endplates 336, 338 may be less than the width of the belt 320 between opposing edges 322, 324, such that the endplates 336, 338 may be spaced from the tracks 306 and may not contact the chords 326, 328. The body 334 and endplates 336, 338 may be made of metal.

The endplates 336, 338 may each have a hub 340, 342 (which also may be made of metal), with an opening 344, 346 defined therethrough. A drive shaft 348 may be disposed through the openings 344, 346 and the body 334 of the pulley assembly 332. The drive shaft 348 may be joined or coupled to the hubs 340, 342, by keys and/or screws, for example, to transmit torque and motion to the pulley assembly 332, although alternative methods of joining or coupling the drive shaft 348 to the pulley assembly 332 may also be used. As seen in FIG. 31, the drive shaft 348 may be attached to a motor 350, and tensioning assemblies 352, 354, such as those explained above relative to FIGS. 15-17, may also be included.

The pulley assembly 332 may have a textured surface 360, which surface 360 may cooperate with a first surface 362 of the belt 320 (see FIG. 33). The surface 362 of the belt 320 may be referred to as the interior surface of the belt 320, in consideration of the fact that the surface 362 is the surface facing away from the wet chips and other material to be carried by the belt 320. The surface 360 may have a roughened texture, which may better permit the drive pulley assembly 332 to transmit torque and motion from the pulley assembly 332 to the belt 320. In particular, the textured surface 360 may be defined by a covering 364, or lagging, which is disposed on a surface 368 of the body 334 of the pulley assembly 332. Specifically, the lagging 364 may be a polyvinyl chloride (PVC) rough top lagging.

The system 300 may also differ from earlier embodiments (see FIGS. 1-25, for example) in that a driven pulley assembly 382 may be included (see FIG. 31). The driven pulley assembly 382 may be disposed near the end track block 316, and be made of plastic mounted on a central metal shaft, for example. The driven pulley assembly 382, like the drive pulley assembly 332, has a length between opposing ends that is less than the distance between the edges 322, 324 of the belt 320 (i.e., the width of the belt 320), so that the ends of the pulley assembly 332 may be spaced from the tracks 306 and the chords 326, 328. However, unlike the drive pulley assembly 332, torque and motion is not transmitted from the pulley assembly 382 to the belt 320, but may be transmitted from the belt 320 to the pulley assembly 382. The pulley assembly 382 may support the belt 320 while the chords 326, 328 make their passage through the U-shaped notch 318 in the end plates 316. It is believed that the cooperation between the chords 326, 328 and the track 304 may be improved through the use of the pulley assembly 382.

While one or more embodiments have been illustrated and described in detail herein, it will be appreciated that modifications and variation thereof may be effected without departing from the spirit of the invention and the appended claims.

The invention claimed is:

1. A conveyor apparatus for conveying materials, said apparatus comprising:
   a frame assembly including a first frame sidewall and a second frame sidewall spaced from said first sidewall;
   a first track assembly located on said first frame sidewall;
   a second track assembly located on said second frame sidewall and spaced from the first track assembly;
   said track assemblies each including a track extending along the length of said track assembly, the track including one or more slotted track blocks each having a slot;
   a flexible conveyor belt having a first edge and a second edge spaced from said first edge in a lateral direction;
   a first flexible chord member joined to and located contiguous to said first conveyor belt edge;
   a second flexible chord member joined to and located contiguous to said second conveyor belt edge;
   said first track and said first chord member substantially mate with the first chord member received within the slots of the slotted track blocks of the first track to form a substantially dynamic seal between said first track and said first chord member to preclude wet chips and wet chip fluid from passing through at the dynamic seal when said first chord member is disposed within said first track with opposing surfaces of said first track and said first chord member transverse to the lateral direction abutting to limit removal of said first chord member from said first track in the lateral direction, the opposing surfaces being disposed interior and exterior to the belt;
   said second track and said second chord member substantially mate with the second chord member received within the slots of the slotted track blocks of the second track to form a substantially dynamic seal between said second track and said second chord member to preclude wet chips and wet chip fluid from passing through at the dynamic seal when said second chord member is disposed within said track with opposing surfaces of said second track and said second chord member transverse to the lateral direction abutting to limit removal of said second chord member from said second track in the lateral direction, the opposing surfaces being disposed interior and exterior to the belt; and, a drive assembly connected to said frame assembly for actuating said conveyor belt to travel relative to said track assemblies whereby said first chord member slides within said first track and said second chord member slides within said second track.

2. A conveyor apparatus in accordance with claim 1 wherein:
said first track assembly includes an upper track and a lower track spaced from said upper track;
said second track assembly includes an upper track and a lower track spaced from said upper track; and
said conveyor belt and said chord members are endless.

3. A conveyor apparatus in accordance with claim 2 further comprising:
a first track end block having a track, said first track end block being positioned contiguous to said upper and lower spaced tracks of said first track assembly, said first end block track being substantially aligned with said upper and lower tracks of said first track assembly; and
a second track end block having a track, said second track end block being positioned contiguous to said upper and lower spaced tracks of said second track assembly, said second end block track being substantially aligned with said upper and lower tracks of said second track assembly.

4. A conveyor apparatus in accordance with claim 3 wherein said drive assembly comprises:
a motor assembly;
a drive shaft connected to said motor assembly and mounted for rotation on said frame assembly; and
a drive pulley assembly attached to the drive shaft and having a textured surface that cooperates with a surface of the conveyor belt.

5. A conveyor apparatus in accordance with claim 4 wherein said drive pulley assembly comprises a cylindrical tube body and a lagging disposed on a surface of said tube body.

6. A conveyor apparatus in accordance with claim 5 wherein:
said tube body has spaced ends and a length between said ends; and
said belt has a width between said edges, the length of the tube body being less than the width of the belt.

7. A conveyor assembly in accordance with claim 6 wherein:
said frame sidewalls have first and second ends;
said drive pulley assembly is disposed at said first ends; and
said drive assembly comprises a driven pulley disposed at said second ends.

8. A conveyor assembly in accordance with claim 4 further comprising a belt tensioning assembly attached to said frame assembly for moving said drive shaft relative to said conveyor belt.

9. A conveyor apparatus in accordance with claim 1 further comprising a conveyor belt support assembly, said conveyor belt support assembly comprising:
a plurality of spaced traverse support bars, each bar having a first side and second side;
each bar traversing said first and second frame sidewalls and being joined to said sidewalls; and
a plurality of spaced rod-like members, each rod like member being disposed on and joined to said spaced bar members.

10. A conveyor apparatus in accordance with claim 1 wherein each chord member is integral with said conveyor belt.

11. A conveyor apparatus in accordance with claim 1 wherein each chord member is attached to said conveyor belt.

12. A conveyor apparatus in accordance with claim 1 wherein each chord member is made of the same material as the conveyor belt material and is integral with said conveyor belt.

13. A conveyor apparatus in accordance with claim 1 wherein said conveyor belt is porous.

14. A conveyor apparatus in accordance with claim 1 further comprising a vacuum apparatus coupled to underside of said conveyor belt to pull a vacuum on said an underside of said conveyor belt.

15. A conveyor apparatus for conveying materials, said apparatus comprising:
a frame assembly including first and second spaced frame sidewalls;
a first track assembly located on said first frame sidewall;
a second track assembly located on said second frame sidewall and spaced from the first track assembly;
said first track assembly having a pair of spaced tracks, the spaced tracks each including one or more slotted track blocks each having a slot;
said second track assembly having a pair of spaced tracks, the spaced tracks each including one or more slotted track blocks each having a slot;
a first track end block positioned on said first frame sidewall contiguous to said first track assembly and having a first end block track that joins said first and second tracks on said first track assembly;
a second track end block positioned or said second frame sidewall contiguous to said second track assembly and having a second end block track that joins said first and second tracks or said second track assembly;
a conveyor belt having a first edge and second edge;
a first chord member joined to and located along said first conveyor belt edge;
a second chord member joined to and located along said second conveyor belt edge;
said first track and said first chord member substantially mate with the first chord member received within the slots of the slotted track blocks of the first track to form a substantially dynamic seal between said first track and said first chord member to preclude wet chips and wet chip fluid from passing through at the dynamic seal when said first chord member is disposed within said first track with opposing surfaces of said first track and said first chord member transverse to the lateral direction abutting to limit removal of said first chord member from said first track in the lateral direction, the opposing surfaces being disposed interior and exterior to the belt;
said second track and said second chord member substantially mate with the second chord member received within the slots of the slotted track blocks of the second track to form a substantially dynamic seal between said second track and said second chord member to preclude wet chips and wet chip fluid from passing through at the dynamic seal when said second chord member is disposed within said second track with opposing surfaces of said second track and said second chord member transverse to the lateral direction abutting to limit removal of said second chord member from said second track in the lateral direction, the opposing surfaces being disposed interior and exterior to the belt; and, a drive assembly connected to said frame for actuating said conveyor belt to travel relative to said tracks whereby said first chord member slides within said tracks in said first track assembly said and said second chord member slides within said tracks in said second track assembly.

16. A conveyor apparatus in accordance with claim 15 wherein said conveyor belt and chord members are endless.

17. A conveyor apparatus in accordance with claim 15 wherein:

said end block contiguous to said first track assembly has a U-shaped track having substantially the defined cross-sectional shape of the first track assembly tracks; and said end block contiguous to said second track assembly has a U-shaped track having substantially the defined cross-sectional shape of the second track assembly tracks.

18. A conveyor apparatus in accordance with claim 15 wherein said drive assembly comprises:

a motor assembly;

a drive shaft coupled to said motor assembly;

a pair of spaced bearing assemblies, each bearing assembly being mounted in a frame sidewall and said drive shaft being disposed in said bearing assemblies; and a drive pulley assembly attached to the drive shaft and having a textured surface that cooperates with a surface of the conveyor belt.

19. A conveyor apparatus in accordance with claim 15 further comprising a vacuum apparatus coupled to an underside of said conveyor belt to pull a vacuum on said underside of said conveyor belt.

20. A method of conveying material in a conveyor with an apparatus comprising:

a frame assembly including a first frame sidewall and a second frame sidewall spaced from said first sidewall;

a first track assembly located on said first frame sidewall;

a second track assembly located on said second frame sidewall and spaced from the first track assembly;

said track assemblies each including a track extending along the length of said track assembly, the track including one or more slotted track blocks each having a slot;

a flexible conveyor belt having a first edge and a second edge spaced from said first edge;

a first flexible chord member joined to and located contiguous to said first conveyor belt edge;

a second flexible chord member joined to and located contiguous to said second conveyor belt edge;

said first track and said first chord member substantially mate with the first chord member received within the slots of the slotted track blocks of the first track to form a substantially dynamic seal between said first track and said first chord member to preclude wet chips and wet chip fluid from passing through at the dynamic seal when said first chord member is disposed within said first track with opposing surfaces of said first track and said first chord member transverse to the lateral direction abutting to limit removal of said first chord member from said first track in the lateral direction, the opposing surfaces being disposed interior and exterior to the belt;

said second track and said second chord member substantially mate with the second chord member received within the slots of the slotted track blocks of the second track to form a substantially dynamic seal between said second track and said second chord member to preclude wet chips and wet chip fluid from passing through at the dynamic seal when said second chord member is disposed within said track with opposing surfaces of said second track and said second chord member transverse to the lateral direction abutting to limit removal of said second chord member from said second track in the lateral direction, the opposing surfaces being disposed interior and exterior to the belt;

a drive assembly connected to said frame assembly for actuating said conveyor belt to travel relative to said track assemblies whereby said first chord member slides within said first track and said second chord member slides within said second track;

said method comprising:

placing material to be conveyed on said conveyor belt;

sliding said chord members joined to said conveyor belt relative to said track assemblies to cause said conveyor belt to move from one location to a second location; and precluding said material on said conveyor belt substantially from exiting said conveyor belt at the edges of said conveyor belt while said belt is moving.

21. The method according to claim 20, the conveyor belt having an underside, and the method further comprising pulling a vacuum on said underside of said conveyor belt.

22. A conveyor apparatus in accordance with claim 1 wherein each of said chord members has a cross-section and said tracks of said first and second track assemblies are slotted to extend substantially entirely about the cross-section of the chord members and have a slot cross-section that it substantially similar to the cross-section of the chord members.

23. A conveyor apparatus in accordance with claim 22 wherein each of said chord members has a circular cross-section and said tracks of said first and second track assemblies have a circular cross-section substantially similar to the circular cross-section of the chord members.

* * * * *